(12) United States Patent
Naitou et al.

(10) Patent No.: US 9,489,544 B2
(45) Date of Patent: Nov. 8, 2016

(54) DATA COMMUNICATION AUTHENTICATION SYSTEM FOR VEHICLE GATEWAY APPARATUS FOR VEHICLE DATA COMMUNICATION SYSTEM FOR VEHICLE AND DATA COMMUNICATION APPARATUS FOR VEHICLE

(71) Applicant: DENSO CORPORATION, Kariya, Aichi-pref. (JP)

(72) Inventors: Hideto Naitou, Obu (JP); Mitsuyoshi Natsume, Hekinan (JP); Yuzo Harata, Chiryu (JP); Shouichirou Hanai, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/318,723

(22) Filed: Jun. 30, 2014

(65) Prior Publication Data
US 2014/0317729 A1    Oct. 23, 2014

Related U.S. Application Data

(62) Division of application No. 13/771,696, filed on Feb. 20, 2013.

(30) Foreign Application Priority Data

Feb. 20, 2012 (JP) .................................. 2012-33945
Mar. 23, 2012 (JP) .................................. 2012-67383

(51) Int. Cl.
*G06F 21/85* (2013.01)
*H04L 29/06* (2006.01)
(Continued)

(52) U.S. Cl.
CPC .......... *G06F 21/85* (2013.01); *H04L 12/6418* (2013.01); *H04L 63/0428* (2013.01); *H04L 63/0471* (2013.01); *H04L 63/08* (2013.01); *H04L 67/12* (2013.01)

(58) Field of Classification Search
CPC ........ G06F 21/30; G06F 21/44; G06F 21/85; H04L 12/6418; H04L 63/0428; H04L 63/0471; H04L 63/08; H04L 67/12
USPC .................................................. 726/4, 9, 21
See application file for complete search history.

(56) References Cited

U.S. PATENT DOCUMENTS 7,484,008 B1 *  1/2009  Gelvin et al. ................. 709/249
7,529,938 B2 *  5/2009  Shibata et al. ................ 713/169
(Continued)

FOREIGN PATENT DOCUMENTS

EP    1657436 A2  *  5/2006
JP    2002232438 A  *  8/2002  ............. H04L 12/40
(Continued)

OTHER PUBLICATIONS

Office Action dated Aug. 29, 2014, issued in U.S. Appl. No. 13/771,696 of Naitou, filed Feb. 20, 2013 (24 pages).
(Continued)

*Primary Examiner* — Andrew Nalven
*Assistant Examiner* — Walter Malinowski
(74) *Attorney, Agent, or Firm* — Nixon & Vanderhye P.C.

(57) ABSTRACT

A vehicular data communication system includes an authentication device for authenticating an external tool connected to a bus, an authentication control device for determining whether an external tool is authenticated by the authentication device and for setting an authenticated state to permit a data communication between the external tool and an access target ECU on the bus upon determining that the external tool is authenticated by the authentication device, and an authentication maintain device for maintaining the authenticated state within a predetermined period after the authenticated state is set by the authentication control device.

11 Claims, 33 Drawing Sheets

(51) Int. Cl.
*H04L 12/64* (2006.01)
*H04L 29/08* (2006.01)

(56) References Cited

U.S. PATENT DOCUMENTS

| | | | |
|---|---|---|---|
| 7,891,004 B1* | 2/2011 | Gelvin | H04L 67/12 701/24 |
| 2002/0110146 A1* | 8/2002 | Thayer et al. | 370/465 |
| 2002/0120856 A1* | 8/2002 | Schmidt et al. | 713/193 |
| 2003/0009271 A1* | 1/2003 | Akiyama | 701/33 |
| 2003/0061499 A1 | 3/2003 | Durrant | |
| 2003/0147534 A1* | 8/2003 | Ablay et al. | 380/270 |
| 2003/0195033 A1* | 10/2003 | Gazdic et al. | 463/20 |
| 2004/0185842 A1* | 9/2004 | Spaur et al. | 455/420 |
| 2005/0278528 A1* | 12/2005 | Kathan | 713/168 |
| 2006/0115085 A1 | 6/2006 | Iwamura | |
| 2006/0253718 A1* | 11/2006 | Kawase | G06F 1/3203 713/300 |
| 2006/0282897 A1* | 12/2006 | Sima | G06F 11/3664 726/25 |
| 2007/0118752 A1 | 5/2007 | Kiessling et al. | |
| 2007/0121641 A1* | 5/2007 | Hovey et al. | 370/395.2 |
| 2007/0124599 A1* | 5/2007 | Morita et al. | 713/186 |
| 2007/0147615 A1* | 6/2007 | Chou | G06F 21/305 380/270 |
| 2007/0227489 A1* | 10/2007 | Ando | 123/179.3 |
| 2007/0247288 A1* | 10/2007 | Alrabady | 340/425.5 |
| 2008/0022061 A1* | 1/2008 | Ito | G11B 20/00086 711/162 |
| 2008/0059806 A1* | 3/2008 | Kishida | G06F 21/35 713/186 |
| 2008/0092214 A1* | 4/2008 | Zavalkovsky | H04L 63/08 726/4 |
| 2008/0278282 A1* | 11/2008 | Waldmann | G06F 21/445 340/5.8 |
| 2009/0007250 A1* | 1/2009 | Pouzin et al. | 726/10 |
| 2009/0037743 A1* | 2/2009 | Narayanaswami | 713/186 |
| 2009/0044255 A1* | 2/2009 | Okuyama | 726/4 |
| 2009/0112397 A1* | 4/2009 | Roberts et al. | 701/35 |
| 2009/0183252 A1* | 7/2009 | Nomi | 726/13 |
| 2009/0300365 A1* | 12/2009 | Karmes et al. | 713/182 |
| 2009/0319287 A1* | 12/2009 | Hammad et al. | 705/1 |
| 2010/0031346 A1* | 2/2010 | Kano | 726/19 |
| 2010/0049386 A1* | 2/2010 | Bamba | 701/21 |
| 2010/0220857 A1* | 9/2010 | Kawamura et al. | 380/44 |
| 2010/0251387 A1* | 9/2010 | Takeda et al. | 726/29 |
| 2011/0013522 A1* | 1/2011 | Kishigami | H04L 12/12 370/242 |
| 2011/0083161 A1* | 4/2011 | Ishida et al. | 726/2 |
| 2011/0160954 A1* | 6/2011 | Yamaguchi | B60C 23/0481 701/33.4 |
| 2011/0258431 A1* | 10/2011 | Gundavelli et al. | 713/150 |
| 2012/0140861 A1 | 6/2012 | Menon et al. | |
| 2013/0031212 A1* | 1/2013 | Enosaki | H04L 12/40 709/218 |
| 2013/0091907 A1* | 4/2013 | Nishijima | B60L 11/14 70/237 |
| 2013/0111582 A1* | 5/2013 | Forest | 726/19 |
| 2013/0204513 A1* | 8/2013 | Pandy et al. | 701/114 |
| 2013/0218371 A1* | 8/2013 | Simard et al. | 701/2 |
| 2013/0219170 A1 | 8/2013 | Naitou et al. | |
| 2013/0227650 A1* | 8/2013 | Miyake | 726/3 |

FOREIGN PATENT DOCUMENTS

| | | | | |
|---|---|---|---|---|
| JP | 2003-324459 | | 11/2003 | |
| JP | 2004-179772 | | 6/2004 | |
| JP | 2004179772 | A * | 6/2004 | H04L 12/46 |
| JP | 2004-192277 | | 7/2004 | |
| JP | 2004192277 | A * | 7/2004 | G06F 17/60 |
| JP | 2004-224284 | | 8/2004 | |
| JP | 2004224284 | A * | 8/2004 | B60R 16/02 |
| JP | 2006-53620 | | 2/2006 | |
| JP | 2006053620 | A * | 2/2006 | |
| JP | 2006-160126 | | 6/2006 | |
| JP | 2010-62883 | | 3/2010 | |
| JP | WO 2012020306 | A1 * | 2/2012 | B60L 11/14 |

OTHER PUBLICATIONS

Office Action dated Mar. 20, 2015, issued in U.S. Appl. No. 13/771,696 of Naitou, filed Feb. 20, 2013 (36 pages).

Advisory Action dated Jun. 3, 2015, issued in U.S. Appl. No. 13/771,696 of Naitou, filed Feb. 20, 2013 (4 pages).

Japanese Office Action issued in JP Application No. 2012-033945 dated Jun. 23, 2015 w/ translation.

* cited by examiner

DATA COMMUNICATION AUTHENTICATION SYSTEM FOR VEHICLE GATEWAY APPARATUS FOR VEHICLE DATA COMMUNICATION SYSTEM FOR VEHICLE AND DATA COMMUNICATION APPARATUS FOR VEHICLE

CROSS REFERENCE TO RELATED APPLICATION

The present application is a divisional application of application Ser. No. 13/771,696, filed Feb. 20, 2013 and is based on Japanese Patent Applications No. 2012-33945 filed on Feb. 20, 2012 and 2012-67383 filed on Mar. 23, 2012, disclosures of which are incorporated herein by reference.

TECHNICAL FIELD

The present disclosure relates to a vehicular data communication authentication system in which an external tool is connectable to an electronic control unit (ECU). The present disclosure also relates to a vehicular gateway apparatus connected with the vehicular data communication authentication system to partition the external tool from the ECU. The present disclosure also relates to a vehicular data communication system including a vehicular data communication apparatus connected with multiple nodes through a bus. The present disclosure also relates to such a vehicular data communication apparatus.

BACKGROUND

It is known that a data communication between electronic control units (ECUs) serving as nodes is performed through a bus, and that a data communication between an ECU and an external tool is performed through a bus. When the data communication is performed between the external tool and the ECU, it becomes possible to access to the ECU by connecting the external tool to the bus, and it becomes possible to rewrite a control program of the ECU and read out a data from the ECU (see Patent Document 1 for example).

Patent Document 1: JP 2004-192277A

Specifications of data communication standards and connection interfaces between an external tool and a bus are open to the public. Thus, not only a proper worker can connect a proper external tool to the bus but also a third party having a bad intention can connect an improper external tool to the bus. If the improper external tool is connected to the bus, the vehicle may be subject to attack such as the improper rewriting of the control program of the ECU, the improper reading out of the data from the ECU (so called a masquerading), or the like. The controller area network (CAN) is a data communication standard between the external tool and the ECU. In the CAN, since a data frame is broadcasted, wiretapping and analysis are relatively easy. Additionally, the CAN provides a data field for storing a data, an identifier field for identifying type of a data frame, a cyclic redundancy check (CRC) field for storing CRC check, etc. However, in the CAN, a source field for identifying a source (source address) of a data frame and an authentication field for authenticating a data frame are not provided.

Because of the above, protection measures against the improper connection of the external tool to the bus are desired.

Further, enhancement of security in data communication between ECUs and between the external tool and the ECU is desired. Although it may be possible to enhance the security by providing a node with a data encryption function, this leads to various difficulties such as configuration complication, processing load increase, and the like.

SUMMARY

In view of the foregoing, it is an object of the present disclosure to provide a vehicular data communication authentication system and a vehicular gateway apparatus that can prevent damages resulting from a connection of an improper external tool and can enhance security even if the improper external tool is connected to a bus connected with an ECU.

It is also an object of the present disclosure to provide a vehicular data communication system and a vehicular data communication apparatus that can enhance security in data communication while minimizing node load even if a node does not have a data encryption function.

According to a first example of embodiments, a vehicular data communication authentication system, in which an external tool is connectable to a bus connected with electronic control units (ECUs) including an access target ECU, includes an authentication device, an authentication control device and an authentication maintain device. The authentication device performs authentication of the external tool connected to the bus. The authentication control device determines whether or not a result of the authentication of the external tool preformed by the authentication device is affirmative. When determining that the result of the authentication of the external tool is affirmative, the authentication control device sets an authenticated state and permits a data communication between the external tool and the access target ECU. When determining that the result of the authentication of the external tool is not affirmative, the authentication control device does not set the authenticated state and prohibits the data communication between the external tool and the access target ECU. After the authenticated state is set by the authentication control device, the authentication maintain device maintains the authenticated state within one of: a first period, which is a predetermined period of time elapsed since the authenticated state was set; a second period, which is a period during which an authenticated state maintain request is inputted to the authentication control device; a third period, which is a period during which a vehicle state satisfies a predetermined condition; and a fourth period, which is a period during which the bus is in a communicating state.

According to a second example of embodiments, a vehicular data communication authentication system, in which an external tool is connectable to a bus connected with electronic control units (ECUs) including an access target ECU, includes an authentication device, an authentication control device and an authentication maintain device. The authentication device performs authentication of a vehicle state. The authentication control device determines whether or not a result of the authentication of the vehicle state preformed by the authentication device is affirmative. When determining that the result of the authentication of the vehicle state is affirmative, the authentication control device sets an authenticated state and permits a data communication between the external tool and the access target ECU. When determining that the result of the authentication of the vehicle state is not affirmative, the authentication control device does not set the authenticated state and prohibits the data communication between the external tool and the access target ECU. After the authenticated state is set by the authentication control device, the authentication maintain device maintains the authenticated state within one of: a first period, which is a predetermined period of time elapsed since the authenticated state was set; a second period, which is a period during which an authenticated state maintain request is inputted to the authentication control device; a third period, which is a period during which the vehicle state satisfies a predetermined condition; and a fourth period, which is a period during which the bus is in a communicating state.

According to a third example of embodiments, a vehicular gateway apparatus in a vehicular data authentication system, in which an external tool is connectable to a bus connected with electronic control units (ECUs) including an access target ECU and in which the vehicular gateway apparatus partitions the external tool from the ECUs, includes an authentication device, an authentication control device and an authentication maintain device. The authentication device performs authentication of the external tool connected to the bus. The authentication control device determines whether or not a result of the authentication of the external tool preformed by the authentication device is affirmative. When determining that the result of the authentication of the external tool is affirmative, the authentication control device sets an authenticated state and permits a data communication between the external tool and the access target ECU. When determining that the result of the authentication of the external tool is not affirmative, the authentication control device does not set the authenticated state and prohibits the data communication between the external tool and the access target ECU. After the authenticated state is set by the authentication control device, the authentication maintain device maintains the authenticated state within one of: a first period, which is a predetermined period of time elapsed since the authenticated state was set; a second period, which is a period during which an authenticated state maintain request is inputted to the authentication control device (102e); a third period, which is a period during which a vehicle state satisfies a predetermined condition; and a fourth period, which is a period during which the bus is in a communicating state.

According to a fourth example of embodiments, a vehicular gateway apparatus in a vehicular data authentication system, in which an external tool is connectable to a bus connected with electronic control units (ECUs) including an access target ECU and in which the vehicular gateway apparatus partitions the external tool from the ECUs, includes an authentication device, an authentication control device and an authentication maintain device. The authentication device performs authentication of a vehicle state. The authentication control device determines whether or not a result of the authentication of the vehicle state preformed by the authentication device is affirmative. When determining that the result of the authentication of the vehicle state is affirmative, the authentication control device sets an authenticated state and permits a data communication between the external tool and the access target ECU. When determining that the result of the authentication of the vehicle state is not affirmative, the authentication control device does not set the authenticated state and prohibits the data communication between the external tool and the access target ECU. After the authenticated state is set by the authentication control device, the authentication maintain device maintains the authenticated state within one of: a first period, which is a predetermined period of time elapsed since the authenticated state was set; a second period, which is a period during which an authenticated state maintain request is inputted to the authentication control device (102e); a third period, which is a period during which the vehicle state satisfies a predetermined condition; and a fourth period, which is a period during which the bus is in a communicating state.

According to the above vehicular data communication authentication systems and the vehicular gateway apparatuses, even if an improper external tool is connected to a bus connected with an ECU, it is possible to prevent damages resulting from a connection of the improper external tool and it is possible to enhance security.

According to a fifth example of embodiments, a vehicular data communication system includes a vehicular data communication apparatus connected with nodes through buses. The vehicular data communication apparatus includes an encryption information storage device and an encryption control device. For each combination of one bus connected with a data source node and another bus connected with a data destination node, the encryption information storage device stores an encryption information indicating whether or not a data is to be encrypted, wherein the data source node is one node being a source of the data and the data destination node is another node being a destination of the data. in cases where the vehicular data communication apparatus receives the data from a first node through a first bus and transmits the received data to a second node through a second bus, the encryption control device determines whether to (i) encrypt the received data and transmit the encrypted data to the second node through the second bus or (ii) transmit the received data to the second node through the second bus without encrypting the received data, based on the encryption information stored in the encryption information storage device. Each node includes an decryption information storage device and a decryption control device. For each bus connected with the data source node, the decryption information storage device stores a decryption information indicating whether or not the data is to be decrypted. In cases where the node receives the data from the vehicular data communication apparatus, the decryption control device determines whether to (i) decrypt and process the received data or (ii) process the received data without decrypting the received data, based on the decryption information stored in the decryption information storage device.

According to a sixth example of embodiments, a vehicular data communication system includes a vehicular data communication apparatus connected with nodes through buses. The vehicular data communication apparatus includes an encryption information storage device and an encryption control device. For each combination of a data source node and a data destination node, the encryption information storage device stores an encryption information indicating whether or not a data is to be encrypted, wherein the data source node is one node being a source of the data and the data destination node is another node being a destination of the data. In cases where the vehicular data communication apparatus receives the data from a first node through a first bus and transmits the received data to a second node through a second bus, the encryption control device determines whether to (i) encrypt the received data and transmit the encrypted data to the second node through the second bus or (ii) transmit the received data to the second node through the second bus without encrypting the received data, based on the encryption information stored in the encryption information storage device. Each node includes an decryption information storage device and a decryption control device.

For each data source node, the decryption information storage device stores a decryption information indicating whether or not the data is to be decrypted. In cases where the node receives the data from the vehicular data communication apparatus, the decryption control device determines whether to (i) decrypt and process the received data or (ii) process the received data without decrypting the received data, based on the decryption information stored in the decryption information storage device.

According to a seventh example of embodiments, a vehicular data communication system includes a vehicular data communication apparatus connected with nodes through buses. The vehicular data communication apparatus includes an encryption information storage device and an encryption control device. For each identifier indicative of class a data frame storing a data, the encryption information storage device stores an encryption information indicating whether or not the data is to be encrypted. In cases where the vehicular data communication apparatus receives the data from a first node through a first bus and transmits the received data to a second node through a second bus, an encryption control device determines whether to (i) encrypt the received data and transmit the encrypted data to the second node through the second bus or (ii) transmit the received data to the second node through the second bus without encrypting the received data, based on the encryption information stored in the encryption information storage device. Each node includes an decryption information storage device and a decryption control device. For each identifier indicative of the type of the data frame storing the data, the decryption information storage device stores a decryption information indicating whether or not the data is to be decrypted. In cases where the node receives the data from the vehicular data communication apparatus, the decryption control device determines whether to (i) decrypt and process the received data or (ii) process the received data without decrypting the received data, based on the decryption information stored in the decryption information storage device.

According to an eighth example of embodiments, a vehicular data communication system includes a vehicular data communication apparatus connected with nodes through buses. The vehicular data communication apparatus includes an encryption information storage device and an encryption control device. For each data storage area of a data frame storing a data, the encryption information storage device stores an encryption information indicating whether or not the data is to be encrypted. In cases where the vehicular data communication apparatus receives a data from a first node through a first bus and transmits the received data to a second node through a second bus, the encryption control device determines whether to (i) encrypt the received data and transmit the encrypted data to the second node through the second bus or (ii) transmit the received data to the second node through the second bus without encrypting the received data, based on the encryption information stored in the encryption information storage device. Each node includes an decryption information storage device and a decryption control device. For each data storage area of the data frame storing the data, the decryption information storage device stores a decryption information indicating whether or not the data is to be decrypted. In cases where the node receives the data from the vehicular data communication apparatus, the decryption control device determines whether to (i) decrypt and process the received data or (ii) process the received data without decrypting the received data, based on the decryption information stored in the decryption information storage device.

According to the vehicular data communication systems and the vehicular data communication apparatuses, it is possible to enhance security in data communication while minimizing node load even if a node does not have a data encryption function.

BRIEF DESCRIPTION OF THE DRAWINGS

The above and other objects, features and advantages of the present disclosure will become more apparent from the following detailed description made with reference to the accompanying drawings. In the drawings:

FIG. 3 is a sequence diagram illustrating operations performed after those in

FIG. 2;

DETAILED DESCRIPTION

Figure 1:
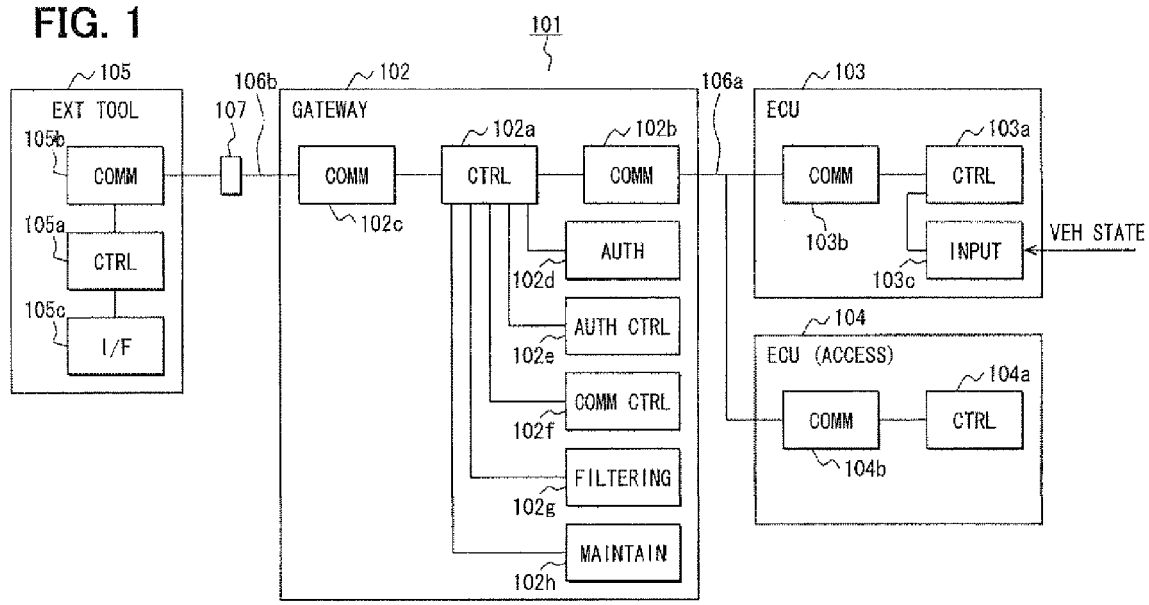
FIG. 1 is a functional block diagram illustrating a data communication authentication system of a first example of a first embodiment.

Embodiments will be described with reference to the drawings. Throughout the below-embodiments, like reference numerals are used to refer to like parts.

First Embodiment

A first embodiment will be described with reference to FIGS. 1 to 23.

First Example of First Embodiment

A first example of the first embodiment will be described with reference to FIGS. 1 to 9.

As shown in FIG. 1, in a vehicular data communication authentication system 101, a vehicular gateway apparatus 102 is connected with a bus 106 so that the gateway apparatus 102 partitions (separates) multiple electronic control units (ECUs) 103, 104 from an external tool 105 (an operating device) operable by an operator. In FIG. 1, two ECUs are illustrated as the multiple ECUs 103, 104. In the present embodiment, a portion of the bus 106 on an ECU side of the gateway apparatus 102 is referred to as an ECU-side bus 106a. That is, the ECU-side bus 106a is a bus for transmitting data between the gateway apparatus 102 and the ECUs 103, 104. A portion of the bus 106 on an external tool side of the gateway apparatus 102 is referred to as an external-tool-side bus 106b. That is, the external-tool-side bus 106b is a bus for transmitting data between the gateway apparatus 102 and the external tool 105.

The ECUs 103, 104 may include, for example, an engine ECU for controlling operation of the engine, a door lock ECU for controlling operation of door lock mechanism, a navigation ECU for controlling navigation operation, a meter ECU for controlling operation of a meter (indicator), or the like. The number of ECUs may be two, three or more, or may be one. The external-tool-side bus 106b is provided with a connector 107 to which the external tool 105 is detachably connectable. By being connected to the connector 107, the external tool 105 is connected to the external-tool-side bus 106b and becomes able to perform the data communication with the gateway apparatus 102.

The bus 106 adopts a controller area network (CAN) as a data communication method. The CAN communication defines a data field for storing a data, an identifier field for identifying type of a data frame, a cyclic redundancy check (CRC) field for storing CRC check, etc. However, in the CAN communication, a source field for identifying a source (source address) of a data frame and an authentication field for authenticating a data frame are not defined.

The gateway apparatus 102 includes a control device 102a, an ECU-side bus communication device 102b, an external-tool-side bus communication device 102c, an authentication device 102d, an authentication control device 102e, a communication control device 102f, a filtering device 102g, and an authentication maintain device 102h. The authentication device 102d can correspond to an example of authentication means or device, and an example of second authentication means or device. The authentication control device 102e can correspond to an example of authentication control means or device, and an example of authentication control means or device. The communication control device 102f can correspond to an example of communication control means or device, and an example of communication control means or device. The authentication maintain device 102h can correspond to an example of authentication maintain means or device, and an example of authentication maintain means or device.

The control device 102a includes a microcomputer. By executing a control program with the microcomputer, the control device 102a controls operations of the ECU-side bus communication device 102b, the external-tool-side bus communication device 102c, the authentication device 102d, the authentication control device 102e, the communication control device 102f, the filtering device 102g, and the authentication maintain device 102h. The ECU-side bus communication device 102b is connected with the ECU-side bus 106a, and controls communication, such as data transmission and receipt, with the ECUs 103 and 104. The external-tool-side bus communication device 102c is connected with the external-tool-side bus 106b. In a state where the external tool 105 is connected to the connector 107, the external-tool-side bus communication device 102c controls communications, such as data transmission and receipt, with the external tool 105.

In the situation where the external tool 105 is connected to the connector 107, the authentication device 102d performs authentication of the external tool 105 (a procedure of the authentication will be described later). Based on a result of the authentication of the external tool 105 by the authentication device 102d, the authentication control device 102e sets whether the data communication between the external tool 105 and an access target ECU should be permitted or prohibited. Specifically, when the result of the authentication of the external tool 105 is affirmative, the authentication control device 102e sets an authenticated state and permits the data communication between the external tool 105 and the access target ECU. When the result of the authentication of the external tool 105 is negative (not affirmative), the authentication control device 102e does not set the authenticated stat and prohibits the data communication between the external tool 105 and the access target ECU.

Regardless of whether the result of the authentication of the external tool 105 performed by the authentication device 102d is affirmative or not, the communication control device 102f sets whether the data communication between the external tool 105 and an access target ECU should be permitted or prohibited. A reason for this exceptional permission is as follows. In a data communication for a vehicle, since it is necessary to always permit a certain part of the data communication, the communication control device 102f exceptionally permits the data communication for a specified data e.g., the below-described regulation message) between the external tool 105 and the access target ECU. In a situation where the authentication control device 102e or the communication control device 102f prohibits the data communication between the external tool 105 and the access target ECU, the filtering device 102g exceptionally permits only for specified data communication. When the authentication control device 102e sets the authenticated state, the authentication maintain device 102h maintains the set authenticated state. That is, when the authentication control device 102e sets the authenticated state, the authentication maintain device 102h maintains a period of permitting the data communication between the external tool 105 and the access target ECU The control device 102a has an encryption function and a decryption function. Specifically, when the external-tool-side-bus communication device 102c receives a plaintext command from the external tool 105, the control device 102a encrypts and rewrites the received plaintext command into an encrypted-text command. When the ECU-side-bus communication device 102b receives an encrypted-text command from the ECU 103 or the ECU 104, the control device 102a decrypts and rewrites the received encrypted-text command into a plaintext command. The encryption and description may use a public-key cryptography, in which the encryption is performed with a public-key and the description is performed with a private-key. Alternatively, the encryption and description may use a common-key cryptography, in which the encryption and decryption are performed with a common-key.

The ECU 103 includes a control device 103a, a bus communication device 103b, and a vehicle state input device 103c. The control device 103a includes a microcomputer. By executing a control program with the microcomputer, the control device 103a controls the bus communication device 103b and the vehicle state input device 103c. The bus communication device 103b is connected with the ECU-side bus 106a and controls communications, such as data transmission and receipt, with the gateway apparatus 102. The vehicle state input device 103c receives and inputs a vehicle state from an external device (e.g., various sensors, different ECUs, wireless communication device etc). The vehicle state inputted by the vehicle state input device 103c may be, for example, a immobilizer state (locked state or unlocked state), an ignition (IG) switch state (on and off), a door state (open state or closed state), or the like.

The ECU 104 includes a control device 104a and a bus communication device 104b. The control device 104a includes a microcomputer. By executing a control program with the microcomputer, the control device 104a controls the bus communication device 104b. The bus communication device 104b is connected with the ECU-side bus 106a and controls communications, such as data transmission and receipt, with the gateway apparatus 102.

It should be noted that if the ECU 103 or 104 is the engine ECU for example, the ECU 103 or 104 includes a functional block (not shown) for controlling the operation of the engine in addition to the above-described functional blocks. If the ECU 103 or 104 is the door lock ECU, the ECU 103 or 104 includes a functional block (not shown) for controlling the operation of the door lock mechanism in addition to the above-described functional blocks. The same is applicable to cases where the ECU 103 or 104 is an ECU other than the engine ECU and the door lock ECU. Alternatively, both of the ECU 103 and the ECU 104 receive and input the vehicle states from externals The external tool 105 includes a control device 105a, a bus communication device 105b and an input/output interface (IF) 105c. The control device 105a includes a microcomputer. By executing a control program with the microcomputer, the control device 105a controls operations of the bus communication device 105b and the input/output interface (IF) 105c. The bus communication device 105b is connected with the external-tool-side bus 106b and controls communications, such as data transmission and receipt, with the gateway apparatus 102. The input/output IF 105c has a function to accept an input operation from the operator operating the external tool 105, and has a function to issue a notification by, for example, displaying a data.

Specifically, by connecting the external tool 105 to the connector 107 and by performing the input operation to the external tool 105, the operator can rewrite the control program of the access target ECU and read out a data from the access target ECU. The external tool 105 is not limited to a dedicated apparatus for rewriting the control program of the access target ECU and reading out the data from the access target ECU. For example, the external tool 105 may be a cellular phone, a personal digital assistance or the like having the above functions.

Operations will be described with reference to FIGS. 2 to 9. Now, it is assumed that the ECU 104 is the access target ECU and that the external tool 105 transmits a data request command to the access target ECU 104 in order to rewrite the control program of the access target ECU 104 or read out a data from the access target ECU 104.

When the control device 105a of the external tool 105 determines that the external tool 105 is connected to the connector 107, the control device 105a transmits an authentication seed request command from the bus communication device 105b to the gateway apparatus 102. When the control device 102a of the gateway apparatus 102 determines that the external-tool-side-bus communication device 102c receives the authentication seed request command from the external tool 105, the control device 102a generates an authentication seed at B101 (see FIG. 2) and transmits the generated authentication seed from the external-tool-side-bus communication device 102c to the external tool 105. The authentication seed includes information used in generating the below-described authentication code, and is written in random number.

When the control device 105a of the external tool 105 determines that the bus communication device 105b receives the authentication seed from the gateway apparatus 102, the control device 105a generates an authentication code based on the authentication seed (while associating the authentication code with the authentication seed) at A101, and the control device 105a transmits the generated authentication code from the bus communication device 105b to the gateway apparatus 102. The authentication code is expressed in random number, like the authentication seed. In the above, it is assumed that the external tool 105 does not possess the authentication seed. However, the external tool 105 may possess the authentication seed. In this configuration, the external tool 105 may generate the authentication code based on the authentication seed possessed by the external tool 105 itself and may transmit the generated authentication code from the bus communication device 105b to the gateway apparatus 102.

In the gateway apparatus 102, when the control device 102a determines that the external-tool-side-bus communication device 102c receives the authentication code from the external tool 105, the control device 102a performs B102. Specifically, at B102, the control device 102a performs cross-check between the authentication seed, which was transmitted to the external tool 105, and the authentication code received from the external tool 105, and determines whether or not the result of the authentication of the external tool 105 is affirmative.

More specifically, a proper external tool, which is connected to the connector 107 by a proper operator, is equipped with a function to (i) correctly generate an authentication based on the authentication seed received from the gateway apparatus 102 and (ii) transmit the correctly-generated authentication code to the gateway apparatus 102. Therefore, when the proper operator connects the proper external tool to the connector 107, there is match between the authentication seed and the authentication code, and the result of the authentication of the external tool 105 becomes affirmative.

An improper external tool, which may be connected to the connector 107 by a third party having a bad intention, is not equipped with the function to correctly generate the authentication based on the authentication seed received from the gateway apparatus 102. Thus, the improper external tool is unable to correctly generate an authentication code or transmit the authentication code to the gateway apparatus, or may transmit an incorrect authentication code to the gateway apparatus 102. As a result, when a third party having a bad intention connects an improper external tool to the connector 107, there is mismatch between the authentication seed and the authentication code, and the result of the authentication of the external tool 105 becomes not affirmative.

In the gateway apparatus 102, when the control device 102a determines that the result of the authentication of the external tool 105 is affirmative and the external tool 105 is a proper external tool (YES at B103), the control device 102a performs B104. At 8104, the control device 102a transmits am affirmative authentication result response command, which indicates that the result of the authentication is affirmative, from the external-tool-side-bus communication device 102c to the external tool 105, and additionally, the control device 102a sets the authenticated state, which is a state where the external tool 105 is authenticated. Within a period during which the authenticated state is set, the control device 102a permits receipt of a data request command from the external tool 105 and permits the data communication. Within a period during which the authenticated state is not set, the control device 102a prohibits the receipt of the data request command from the external tool 105 and prohibits the data communication.

In the external tool 105, when the control device 105a accepts, for example, the input operation from the operator after the control device 105a determines that the bus communication device 105b receives the affirmative authentication response command from the gateway apparatus 102, the control device 105a transmits the data request command from the bus communication device 105b to the gateway apparatus in accordance with the input operation. It should be noted that the data request command transmitted from the external tool 105 to the gateway apparatus 102 includes information for identifying the access target ECU 104, which is a destination of the data request command.

The control device 102a of the gateway apparatus 102 determines that the external-tool-side-bus communication device 102c receives the data request command from the external tool 105, the control device 102a performs 8105. Specifically, at B105, the control device 102a analyzes the received data request command and determines whether or not it is necessary to perform the authentication of the external tool 105. For example, by determining whether the data request command is a regulation message (regulation command) or a non-regulation message (non-regulation command), the control device 102a determines whether or not it is necessary to perform the authentication of the external tool 105. The law-regulation message is a message that gives obligation to answer in response to the request from the external tool 105. For example, the regulation message may be a massage that requests a data about, for example, an engine system, or the like. The non-regulation message is a message that does not give obligation to answer in response to the request from the external tool 105. It should be noted that a determination of whether the data request command is a regulation message or a non-regulation message may correspond to a determination of whether the access target ECU 104, which is a transmission destination of the data request command, is a regulation ECU or a non-regulation ECU.

When the control device 102a determines that the data request command is the non-regulation message and determines that it is necessary perform the authentication of the external tool 105 (YES at B105), the control device performs 8106. At 8106, the control device 102a determines whether the result of the previously-preformed authentication is affirmative or negative. When the control device 102a determines that the result of the previously-preformed authentication is affirmative (YES at B106), the process proceeds to B107. At B107, the control device 102a determines whether or not it is necessary to encrypt the data request command. Specifically, the control device 102a determines whether the data request command is the regulation message or the non-regulation message, thereby determining whether or not it is necessary to encrypt the data request command.

When the control device 102a determines that the data request command is the non-regulation message and determines that it is necessary to encrypt the data request command (YES at B107), the control device 102a encrypts the data request command (B108) and transmits the encrypted data request command from the ECU-side-bus communication device 102b to the access target ECU 104. When the control device 102a determines that the data request command is the regulation message and determines that it is unnecessary to encrypt the data request command (NO at B107), the control device 102a transmits, without encrypting the data request command, the data request command from the ECU-side-bus communication device 102b to the access target ECU 104.

Figure 3:
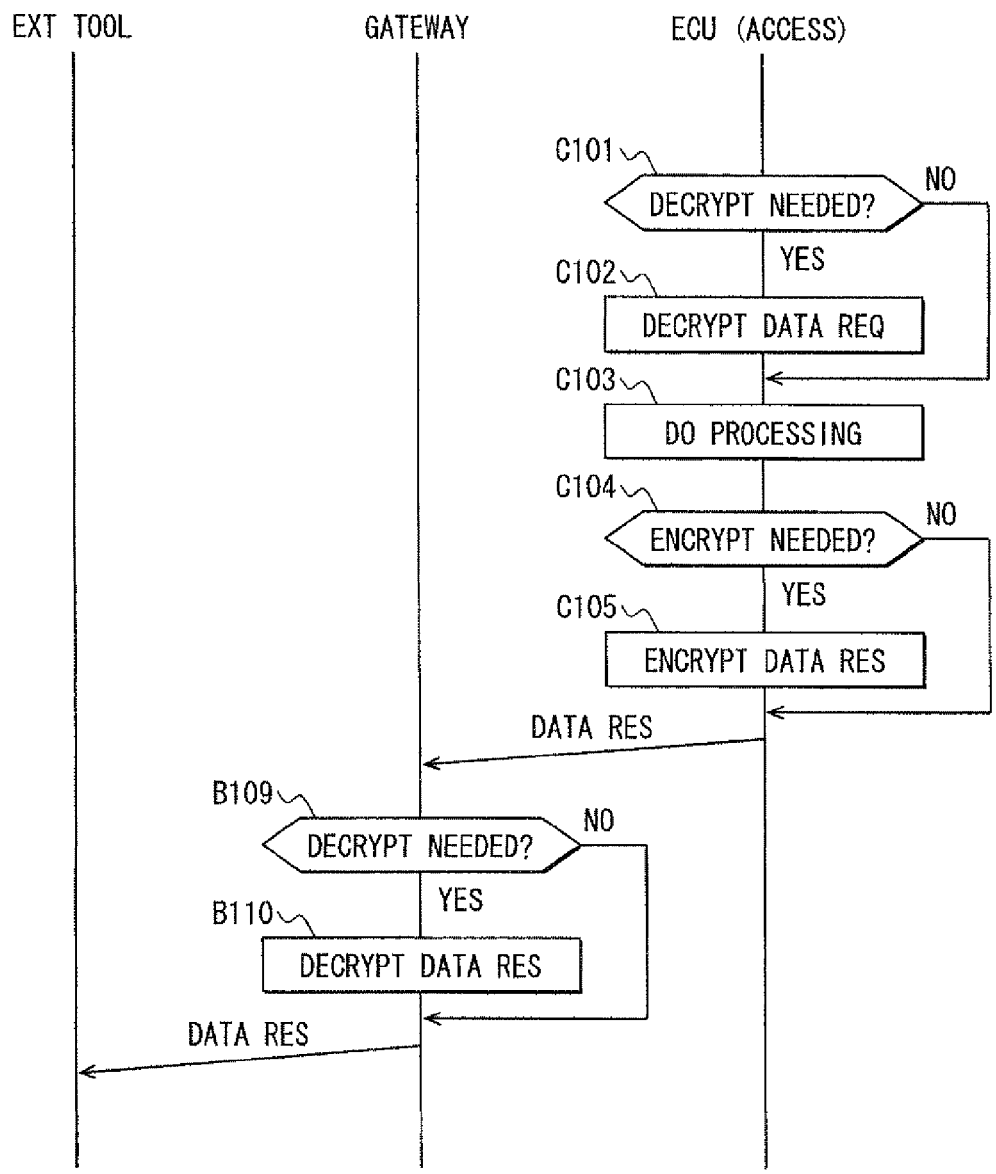

As shown in FIG. 3, in the access target ECU 104, when the control device 104a determines that the bus communication device 104b receives the data request command from the vehicular gateway apparatus 102, the control device 104a determines whether or not it is necessary to decrypt the received data request command (C101). Specifically, when the control device 104a determines that the data request command received from the vehicular gateway apparatus 102 is the encrypted data request command, the control device 104a determines that it is necessary to decrypt the data request command (YES at C101). In this case, the control device 104a decrypts the data request command (C102) and performs data processing according to content of the data request command (C103). The data processing may include rewriting a control program, reading out a data, or the like. When the control device 104a determines that the data request command received from the vehicular gateway apparatus 102 is not encrypted, the control device 104a determines that it is unnecessary to decrypt the data request command (NO at C101). In this case, the control device 104a performs the data processing according to the content of the data request command (C103).

Upon completion of the data processing, the control device 104a determines whether or not it is necessary to encrypt a data response command indicative of the completion of the data processing (C104). For example, when the data request command received from the gateway apparatus 102 is encrypted, the control device 104a determines that it is necessary to encrypt a data response command indicative of the completion of the data processing. When the data request command received from the gateway apparatus 102 was not encrypted, the control device 104a determines that it is unnecessary to encrypt the data response command indicative of the completion of the data processing. Alternatively, importance degrees of data response commands may be preset, and the control device 104a may determines whether or not it is unnecessary to encrypt the data response command indicative of the completion of the data processing, regardless of whether or not the data request command received from the gateway apparatus 102 was encrypted.

When the control device 104a determines that it is necessary to encrypt the data response command (YES at C104), the control device 104a encrypts the data response command (C105) and transmits the encrypted data response command from the bus communication device 104b to the vehicular gateway apparatus 102. When the control device 104a determines that it is unnecessary to encrypt the data response command (NO at C104), the control device 104a transmits, without encrypting the data response command, the data response command from the bus communication device 104b to the vehicular gateway apparatus 102.

In the vehicular gateway apparatus 102, the control device 102a determines that the ECU-side-bus communication device 102b receives the data response command from the access target ECU 104, the control device 102a determines whether or not it is necessary to decrypt the received data response command (B109). Specifically, when the control device 102a determines that the data response command received from the access target ECU 104 is encrypted, the control device 102a determines that it is necessary to decrypt the received data response command (YES at B109). In this case, the control device 102a decrypt the encrypted data response command (B110) and transmits the decrypted data response command from the external-tool-side communication device 102c to the external tool 105. When the control device 102a determines that the data response command received from the access target ECU 104 is not encrypted, the control device 102a determines that it is unnecessary to decrypt the received data response command (NO at B109). In this case, the control device 102a transmits, without decrypting, the data response command from the external-tool-side communication device 102c to the external tool 105.

Figure 2:
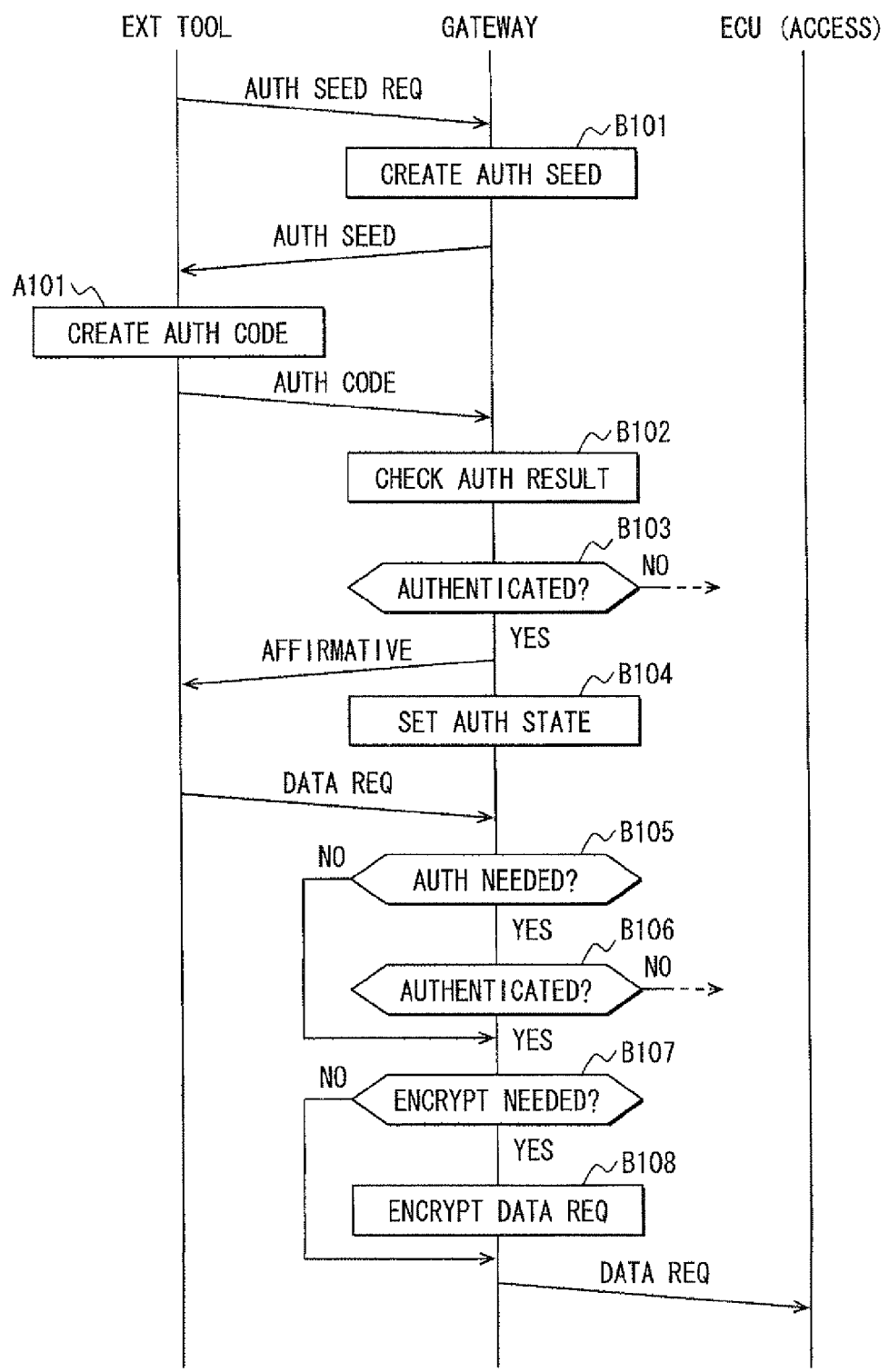
FIG. 2 is a sequence diagram illustrating operations.

As described above, in response to connecting the external tool 105, the control device 102a of vehicular gateway apparatus 102 performs the authentication of the external tool 105. When a result of the authentication of the external tool 105 is affirmative (YES at B103), the control device 102a specifies the external tool 105 connected to the connector 107 as a proper external tool 105, and sets the authenticated state (step B104), as illustrated in FIG. 2. Thereafter, the control device 102a permits receipt of a data request command regardless of whether the data request command is a regulation message or a non-regulation message.

Figure 4:
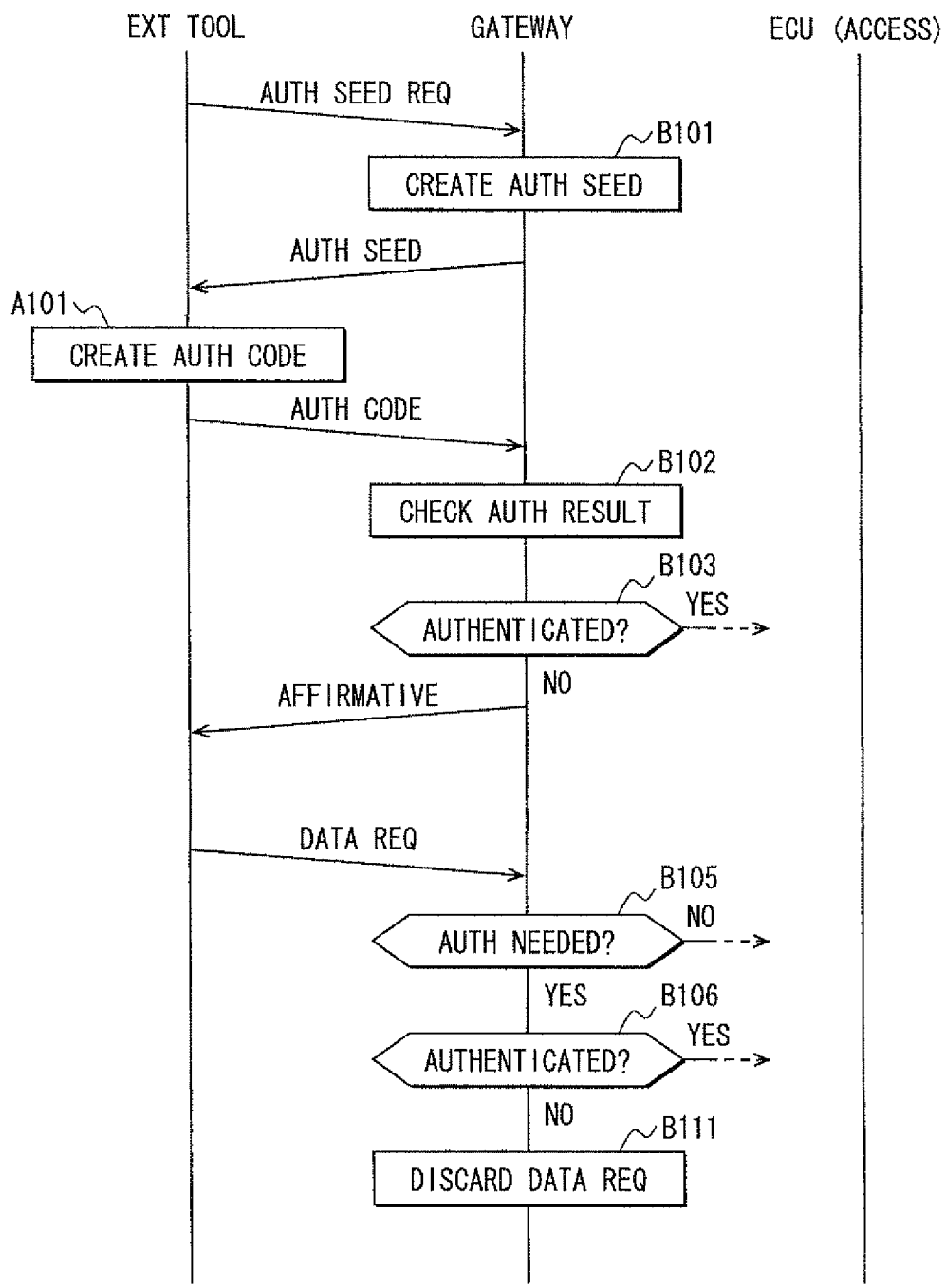
FIG. 4 is a sequence diagram illustrating operations in cases where a vehicular gateway apparatus discards a data request command in response to a negative result of authentication.

As illustrated in FIG. 4, when the control device 102a determines that the result of the authentication of the external tool 105 is negative (NO at B103), the control device 102a specifies the external tool 105 connected to the connector 107 an improper external tool, and does not set the authenticated state. Therefore, when the control device 102a determines that an data request command from the external tool 105 is a non-regulation message requiring the authentication, the control device 102a discards the data request command and rejects the receipt of the data request command to reject the data communication (B111), because the result of the previously-performed authentication is negative and the authenticated state is not set. That is, at B111, the control device 102a rejects the data communication. In this case, the rejection of the receipt of the data request command may include nullifying the data request command without discarding data request command. That is, the rejection of the receipt of the data request command may include prohibiting the processing in line with the content of the data request command.

The above illustration is directed to a situation where, on an as-needed basis, the vehicular gateway apparatus 102 encrypts the data request command received from the external tool 105. Alternatively, the external tool 105 may have a function to encrypt the data request command, and may encrypt the data request command on an as-needed basis.

As described above, when the control device 102a determines that the result of the authentication is affirmative, the control device 102a sets the authenticated state to permit the receipt of the data request command from the external tool 105. A period of maintaining the authenticated state is managed in the following ways.

Specifically, the control device 102a manages the period of maintaining the authenticated state, based on the following first to fourth periods:

(1) A first period from a time when the authenticated state was set to a time a predetermined time has elapsed.

(2) A second period during which an authenticated state maintain request signal is inputted from an external.

(3) A third period during which a vehicle state satisfies a predetermined condition.

(4) A fourth period during which the bus 106 is in a communicating state.

In the following, the first to fourth periods will be illustrated.

(1) The First Period (from a Time when the Authenticated State was Set to a Time a Predetermined Time has Elapsed).

Figure 5:
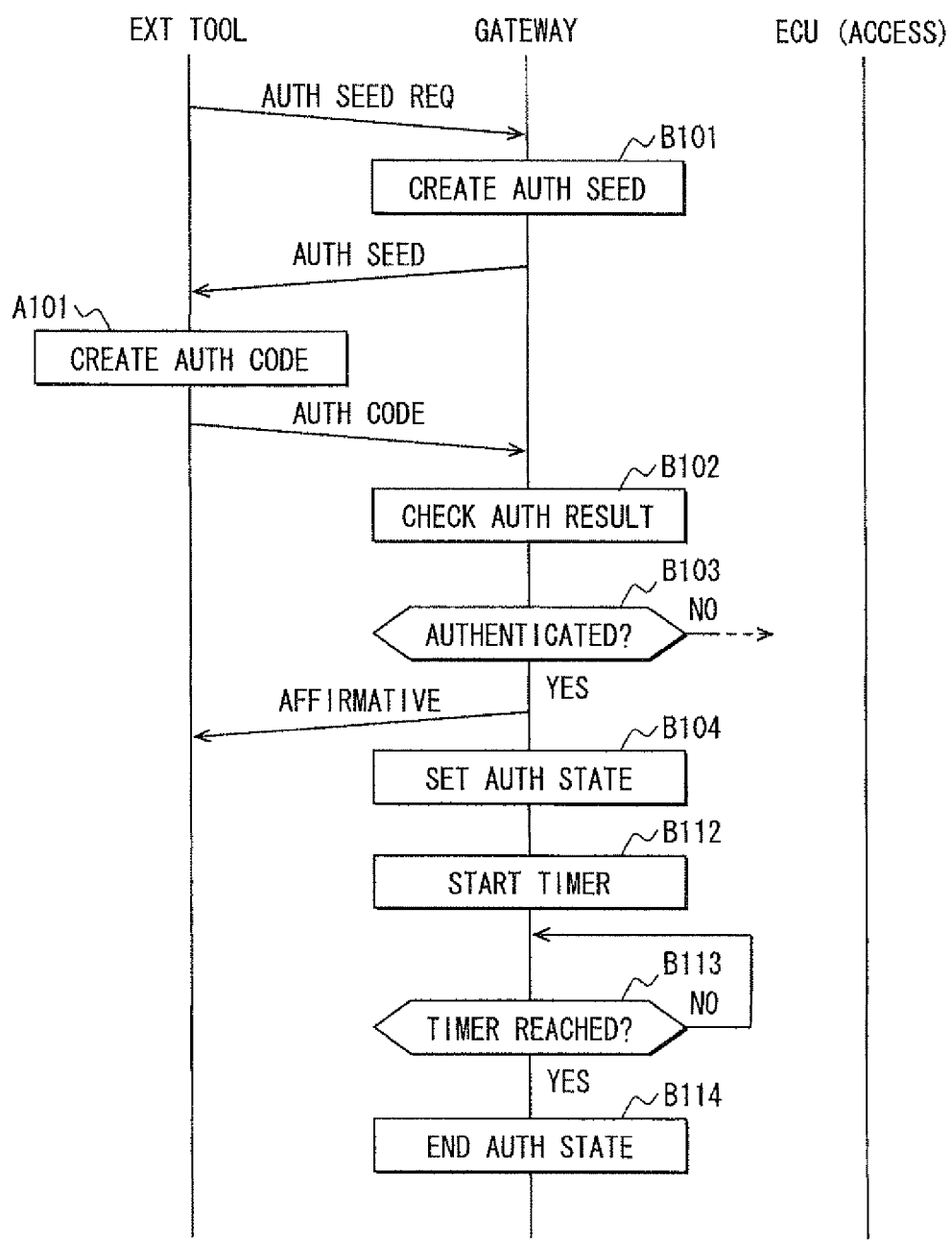
FIG. 5 is a sequence diagram illustrating operations in cases where a vehicular gateway apparatus includes a timer for maintaining an authenticated state.

As shown in FIG. 5, in the vehicular gateway apparatus 102, the control device 102a sets the authenticated state (B104), starts an authentication maintain timer for counting a predetermined time (B112), and monitors whether or not the authentication maintain timer reaches the predetermined time (B113). When the control device 102a determines that the authentication maintain timer reaches the predetermined time (YES at B113), the control device 102a ends the authenticated state. In this example, the period of maintaining the authenticated state is managed by the vehicular gateway apparatus 102 alone. The predetermined time to be counted by the authentication maintain timer may be an initial value set in production, or may be a set value which is set and inputted by the operator operating the external tool 105.

(2) The Second Period (a Period During which the Authenticated State Maintain Request Signal is Inputted from an External).

Figure 6:
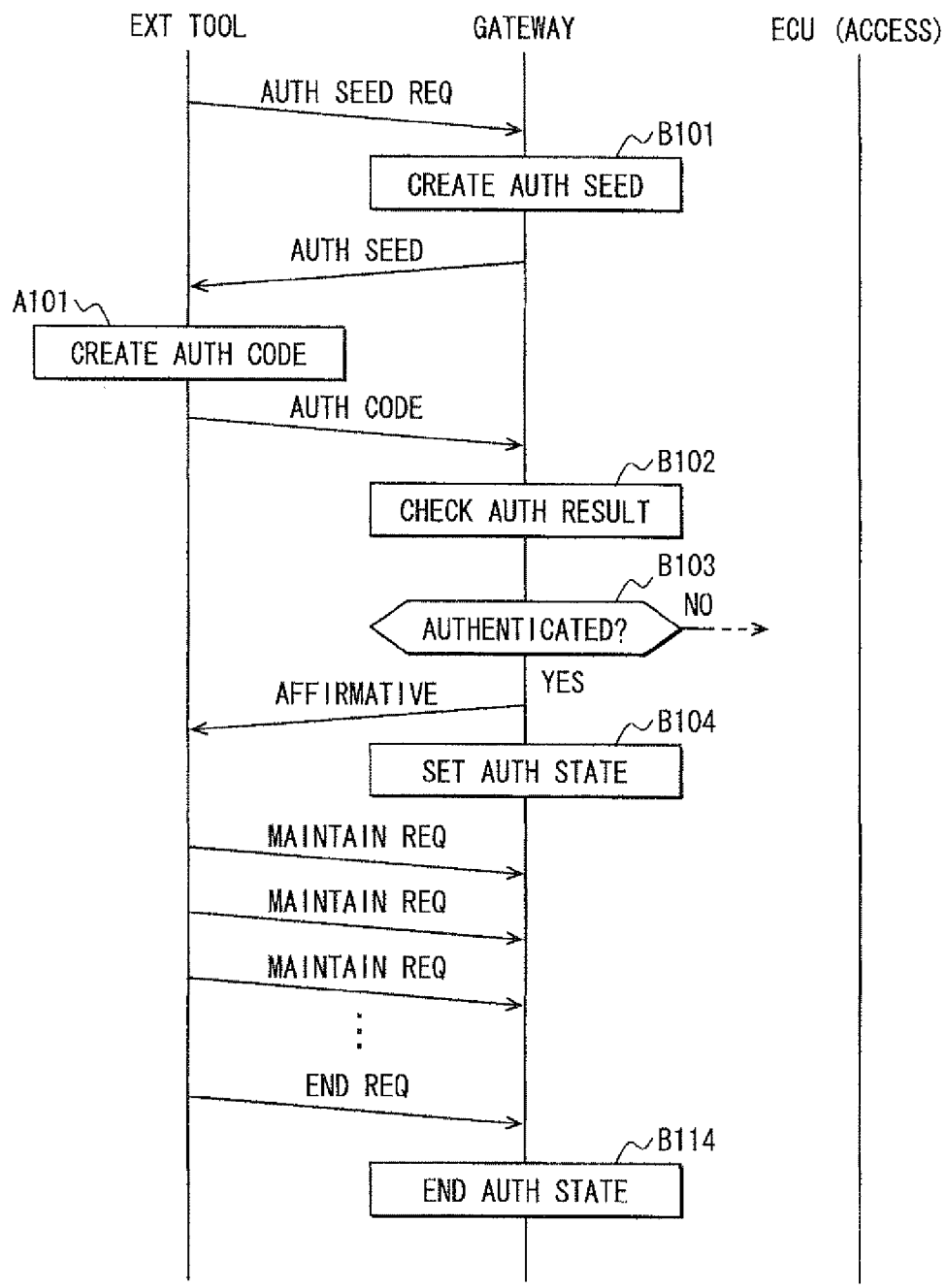
FIG. 6 is a sequence diagram illustrating operations in cases where a vehicular gateway apparatus maintains an authenticated state within a period during which an authenticated state maintain request is inputted from an external tool.

One example is illustrated in FIG. 6. In FIG. 6, after the authenticated state is set (B104), the control device 102a of the vehicular gateway apparatus 102 maintains the authenticated state within a period during which the control device 102a determines that the authenticated state maintain request command is received by the external-tool-side-bus communication device 102c. Upon determining that an authenticated state end request command is received by the external-tool-side-bus communication device 102c, the control device 102a ends the authenticated state (B114). In this example, the external tool 105 leads the control of the period of maintaining the authenticated state.

Figure 7:
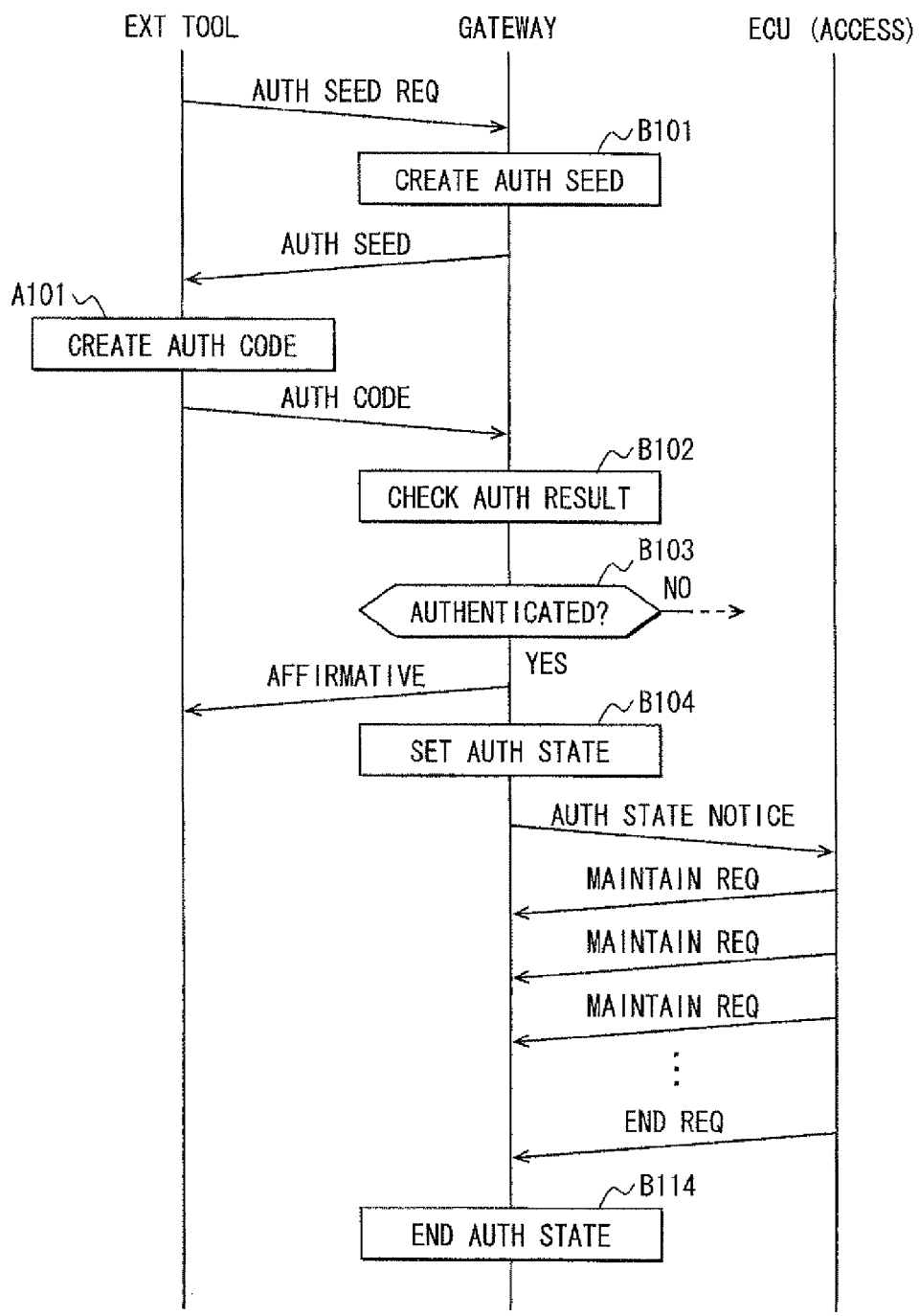
FIG. 7 is a sequence diagram illustrating operations in cases where a vehicular gateway apparatus maintains an authenticated state within a period during which an authenticated state maintain request is inputted from an access target ECU.

Another example is illustrated in FIG. 7. In FIG. 7, after setting the authenticated state (B104), the control device 102a of the vehicular gateway apparatus 102 transmits an authenticated state notice command from the ECU-side-bus communication device 102b to the access target ECU 104, so that the access target ECU 104 transmits the authenticated state maintain request command. Within the period during which the control device 102a determines that the authenticated state maintain request command from the access target ECU 104 is received by the ECU-side-bus communication device 102b, the control device 102a maintains the authenticated state. Upon determining that the authenticated state end request command from the access target ECU is received by the ECU-side-bus communication device 102b, the control device 102a ends the authenticated state (B114). In this example, the access target ECU 104 leads the control of the period of maintaining the authenticated state. It should be noted that the predetermined period during which the external tool 105 or the access target ECU 104 periodically transmits the authenticated state maintain request command to the vehicular gateway apparatus 102 may be an initial value set in production or may be a set value which is set and inputted by the operator operating the external tool 105.

(3) The Third Period (a Period During which the Vehicle State Satisfies the Predetermined Condition)

Figure 8:
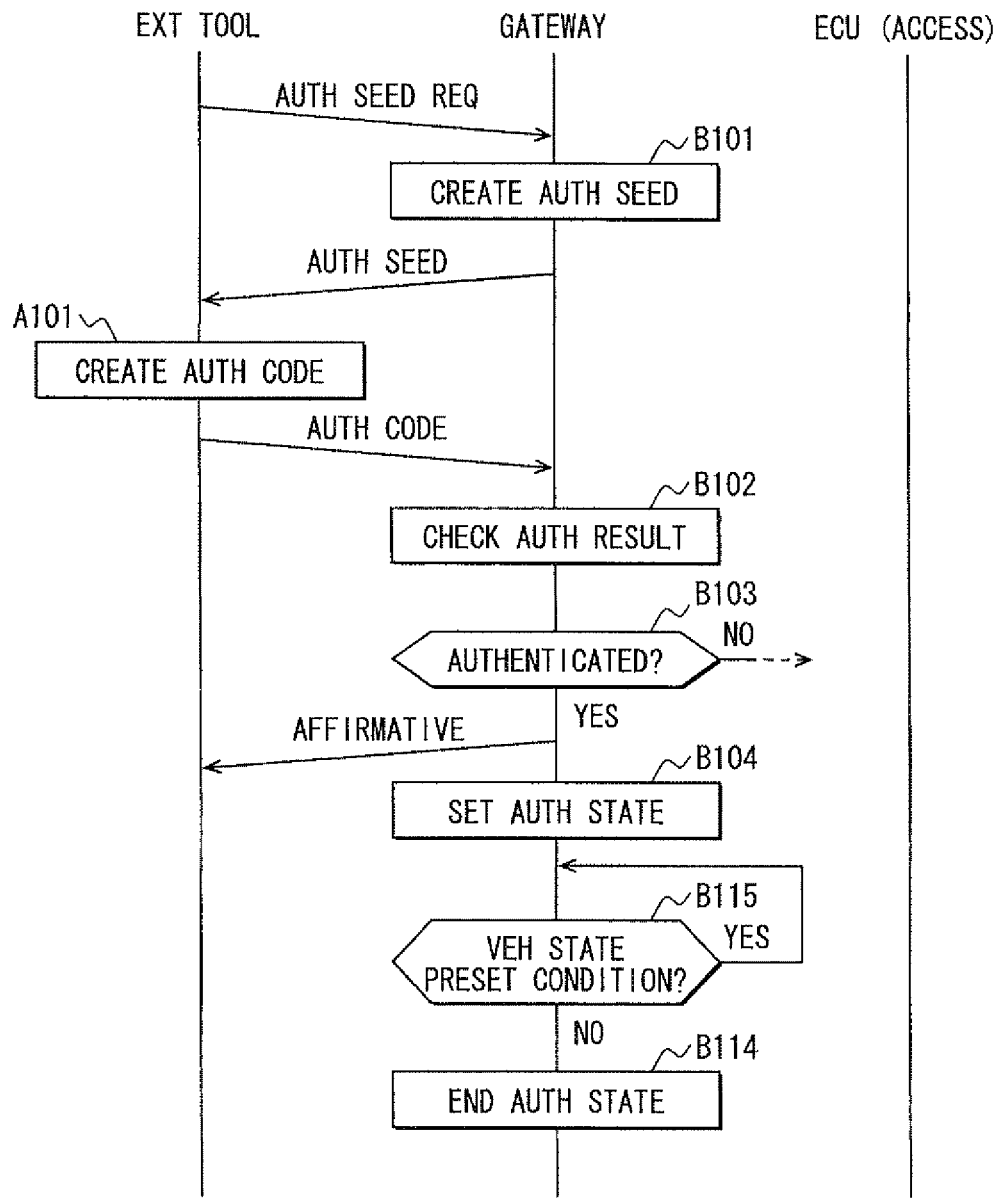
FIG. 8 is a sequence diagram illustrating operations in cases where a vehicular gateway apparatus maintains an authenticated state within a period during which a vehicle state satisfies a predetermined condition.

As shown in FIG. 8, in the vehicular gateway apparatus 102, after setting the authenticated state (B104), the control device 102a determines whether or not the vehicle state satisfies a predetermined condition (B115), by receiving the vehicle state from the ECU 104 through the ECU-side-bus communication device 102b. For example, the predetermined condition may be one of the followings: the immobilizer is in an unlocked state (released state); the ignition switch is off; and the door is in a closed state. That is, when at least one of the above three conditions is satisfied, the control device 102a determines that the vehicle state satisfies the predetermined condition (YES at B115). During a period of determining that the vehicle state satisfies the predetermined condition, the control device 102a maintains the authenticated state. When the control device 102a determines that the vehicle state becomes failing to satisfy the predetermined condition (NO at B115), the control device 102a ends the authenticated state. In this case, the vehicular gateway apparatus 102 leads the control of the period of maintaining the authenticated state.

(4) The Fourth Period (the Period During which the Bus 106 is in the Communicating State)

Figure 9:
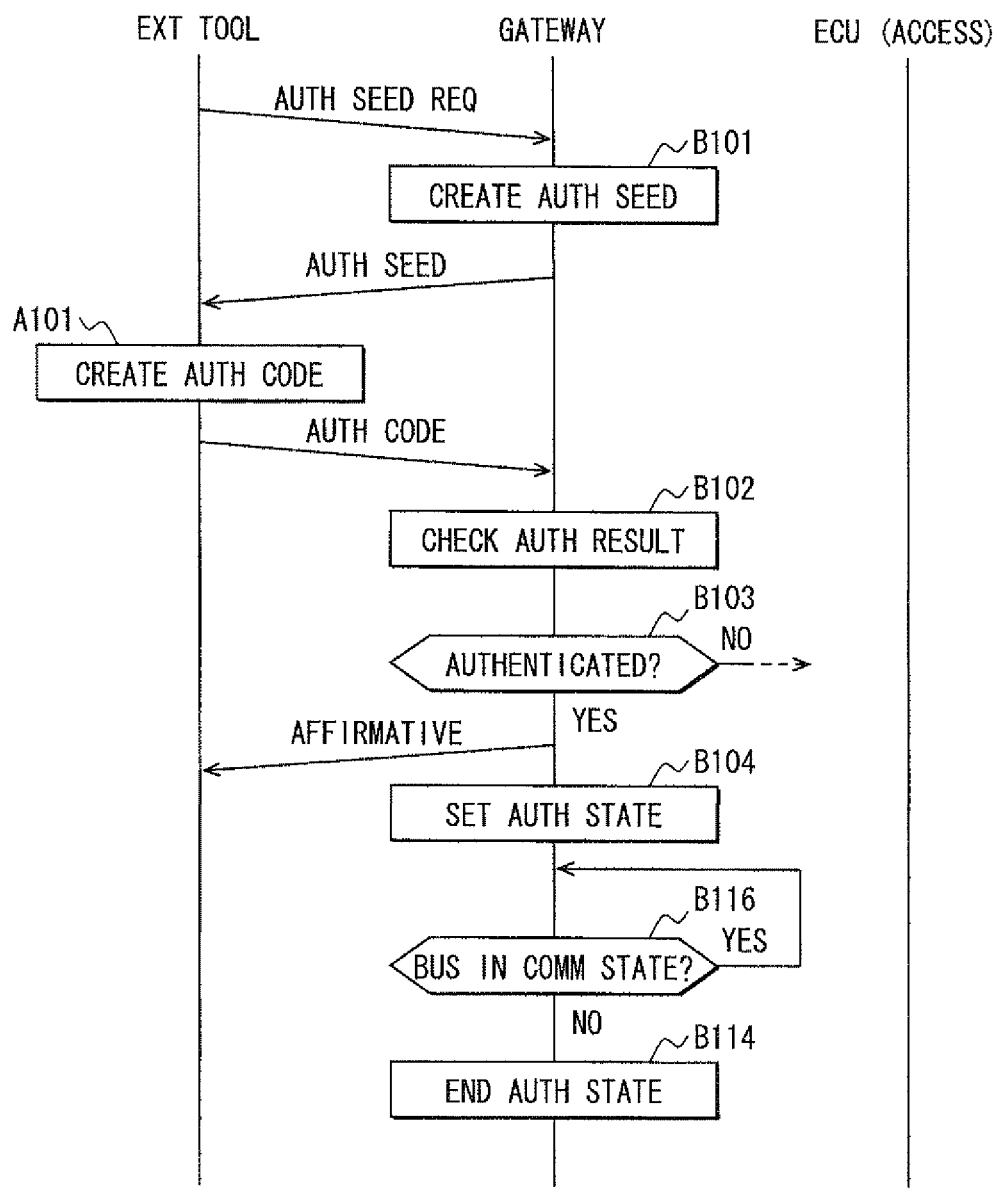
FIG. 9 is a sequence diagram illustrating operations in cases where a vehicular gateway apparatus maintains an authenticated state within a period during which a bus is in a communicating state.

As shown in FIG. 9, after setting the authenticated state (B104), the control device 102a of the vehicular gateway apparatus 102 determines whether or not the bus 106 is in the communicating state (B116). Specifically, when the control device 102a determines that one of the ECU-side-bus communication device 102b and the external-tool-bus communication device 102b is in the communicating state, the control device 102a determines that the bus 106 is in the communicating state (YES at 8116). Within the period during which the control device 102a determines that the bus is in the communicating state, the control device 102a maintains the authenticated state. Upon determining that the bus 106 is changed into a not-communicating state (NO at B116), the control device 102a ends the authenticated state (B114). In this case, the vehicular gateway apparatus manages the period of maintaining the authenticated state, based on the communicating state of the bus 106.

As described above, in the present example of the first embodiment, the vehicular gateway apparatus 102 is connected with the bus 106 so as to partition (separate) the external tool 105 from the ECU 103 and the ECU 104. When the external tool 105 is connected, the vehicular gateway apparatus 102 performs the authentication of the external tool 105. When a result of the authentication of the external tool 105 is affirmative, the vehicular gateway apparatus 102 sets the authenticated state, so that the vehicular gateway apparatus 102 permits the receipt of a subsequent data request command from the external tool 105 regardless of whether or not the data request command is a non-regulation message requiring the authentication. When the result of the authentication of the external tool 105 is negative, the vehicular gateway apparatus 102 does not set the authenticated state, so that when the vehicular gateway apparatus 102 determines that a subsequent data request command from the external tool 105 is a non-regulation message requiring the authentication, the vehicular gateway apparatus 102 rejects the receipt of the data request command.

According to the above configuration, even in cases where an improper external tool is connected to the bus 106, the harms resulting from the connection of the improper external tool can be prevented. As a result, it is possible to enhance security. To achieve this advantage, it is unnecessary to change specifications of data communication between the external tool 105 and the ECUs 103, 104. Additionally, since the period of maintaining the authenticated state is managed, it is possible to avoid unnecessary extension of the period of permitting the data communication between the external tool 105 and the access target ECU after cutting off the connection of the external tool. As a result, it is possible to further enhance the security. Additionally, since the authenticating of the external tool 105, the setting of the authenticated state, and the maintaining of the authenticated state are collectively performed by the vehicular gateway apparatus 102, it is possible to achieve the above advantages by adding the vehicular gateway apparatus 102. Therefore, it is possible to achieve the above advantages while minimizing a change in an existing system.

Additionally, during the period of prohibiting the data communication between the external tool 105 and the access target ECU, the data communication of a specified data (e.g., regulation message) between external tool 105 and the access target ECU is exceptionally permitted. Therefore, while preventing the harms resulting from the connection of the improper external tool, it is possible to ensure the data communication of the specified data.

(Second Example o First Embodiment)

A second example of the first embodiment will be described with reference to FIGS. 9 and 10.

In the first example of the first embodiment, the vehicular gateway apparatus 102 performs the authentication of the external tool 105, sets the authenticated state and maintains the authenticated state. In an vehicular data communication authentication system 121 of the second example, one of ECUs has an authentication function, so that the one of ECUs is designated as an authentication ECU. Additionally, this authentication ECU performs the authentication of the external tool 105, and the vehicular gateway apparatus 102 sets the authenticated state and maintains the authenticated state.

As shown in FIG. 9, in a vehicular data communication authentication system 111, the authentication ECU 103 includes an authentication device 103d. The authentication device 103d is provided as a substitute for the authentication device 103d of the vehicular gateway apparatus 102 of the first example of the first embodiment. That is, the authentication device 103d has substantially the same function as the authentication device 103d.

Figure 10:
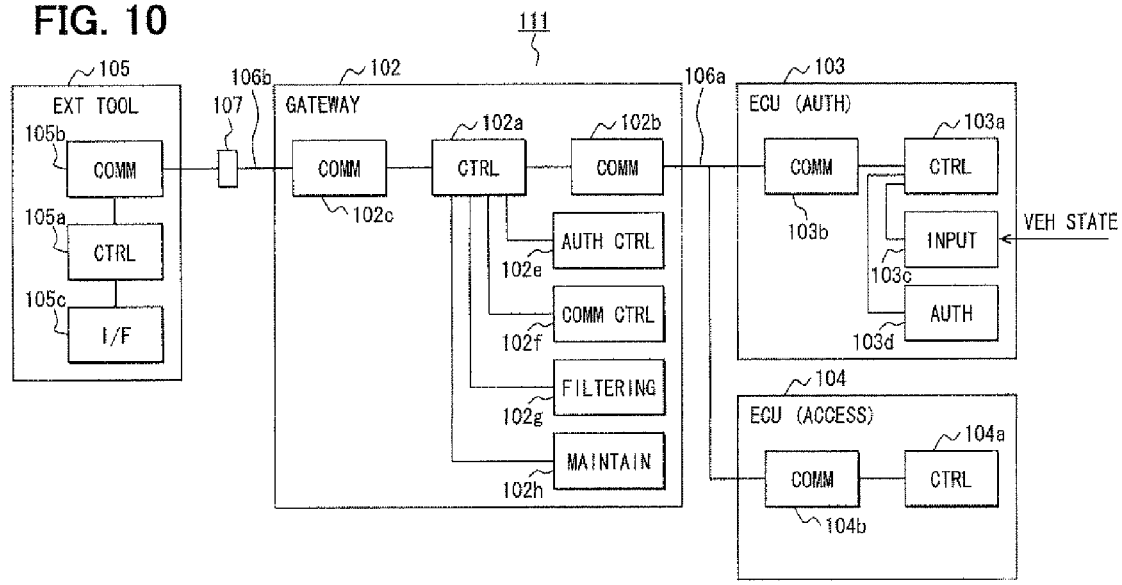
FIG. 10 is a functional block diagram illustrating a data communication authentication system of a second example of the first embodiment.
Figure 11:
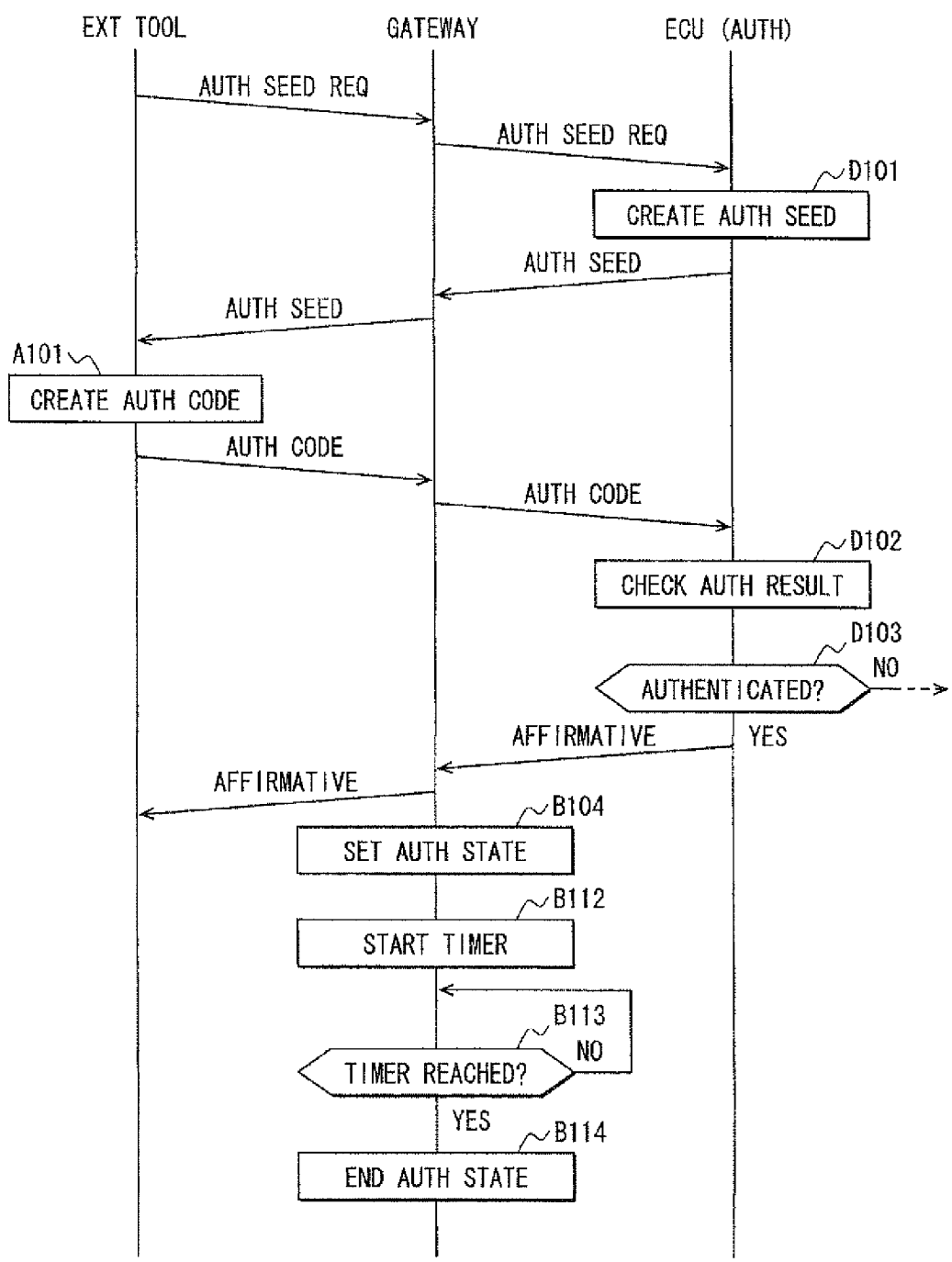
FIG. 11 is a sequence diagram illustrating operations of the second example of the first embodiment.

As shown in FIG. 10, in the authentication ECU 103, when the control device 103a determines that the bus communication device 103b has received an authentication seed request command from the external tool 105 through the vehicular gateway apparatus 102, the control device 103a performs D101 to D103, which correspond to B101 to B103 performed by the vehicular gateway apparatus 102 as illustrated in the first example. When the control device 103a determines that a result of the authentication of the external tool 105 is affirmative (YES at D103), the control device 103a transmits an authentication result affirmative response command, which indicates that the result of the authentication is affirmative, from the bus communication device 103b to the vehicular gateway apparatus 102.

When the control device 102a of the vehicular gateway apparatus 102 determines that the ECU-side-bus communication device 102b has received the authentication result affirmative response command from the authentication ECU, the control device 102a transmits the authentication result affirmative response command to the external tool 105 by using the external-tool-side communication device 102c. Thereafter, the control device 102a performs B104 and B112 to B114, which have already illustrated in the first example. Specifically, the authentication ECU 103 performs the authentication of the external tool 105, and the vehicular gateway apparatus 102 sets the authenticated state. Thereafter, the vehicular gateway apparatus 102 maintains the authenticated state until the predetermined time has elapsed since the authenticated state was set. In the above illustration, the authenticated state is maintained only within the predetermined period after the authenticated state is set. However, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the second example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the authentication ECU 103 performs the authentication of the external tool 105 and since the vehicular gateway apparatus 102 sets and maintains the authenticated state, the authentication of the external tool 105, the setting of the authenticated state and the maintaining of the authenticated state are decentrally performed by the authentication ECU 103 and the vehicular gateway apparatus 102.

(Third Example of First Embodiment)

A third example of the first embodiment will be described with reference to FIGS. 12 and 13. In the third example, the vehicular gateway apparatus 102 connected with the bus 106 is absent. The authentication of the external tool 105, the setting of the authenticated state and the maintaining of the authenticated state are preformed by authentication ECU 103.

Figure 12:
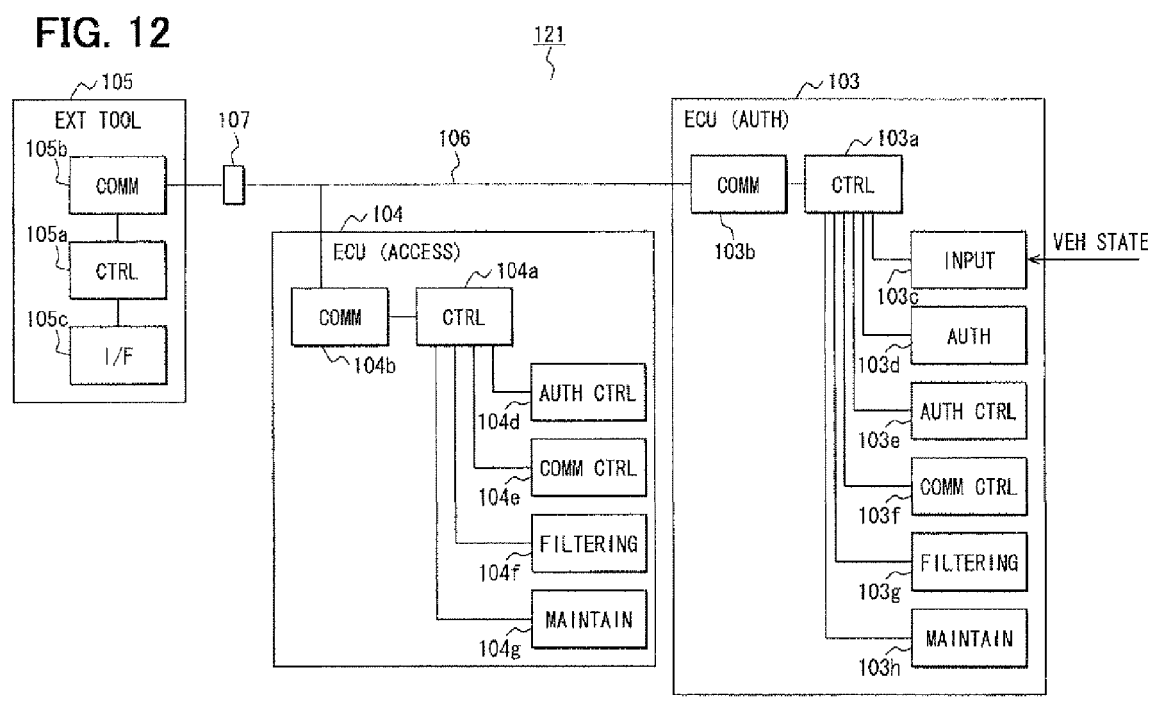
FIG. 12 is a functional block diagram illustrating a data communication authentication system of a third example of the first embodiment.

Specifically, as shown in FIG. 12, in a vehicular data communication authentication system 131, the authentication ECU 103 includes an authentication device 103d, an authentication control device 103e, a communication control device 103f, a filtering device 103g, and an authentication maintain device 103h. The authentication device 103d, the authentication control device 103e, the communication control device 103f, the filtering device 103g and the authentication maintain device 103h, respectively, have substantially the same function as the authentication device 102d, the authentication control device 102e, the communication control device 102f, the filtering device 102g and the authentication maintain device 102h illustrated in the first example.

Figure 13:
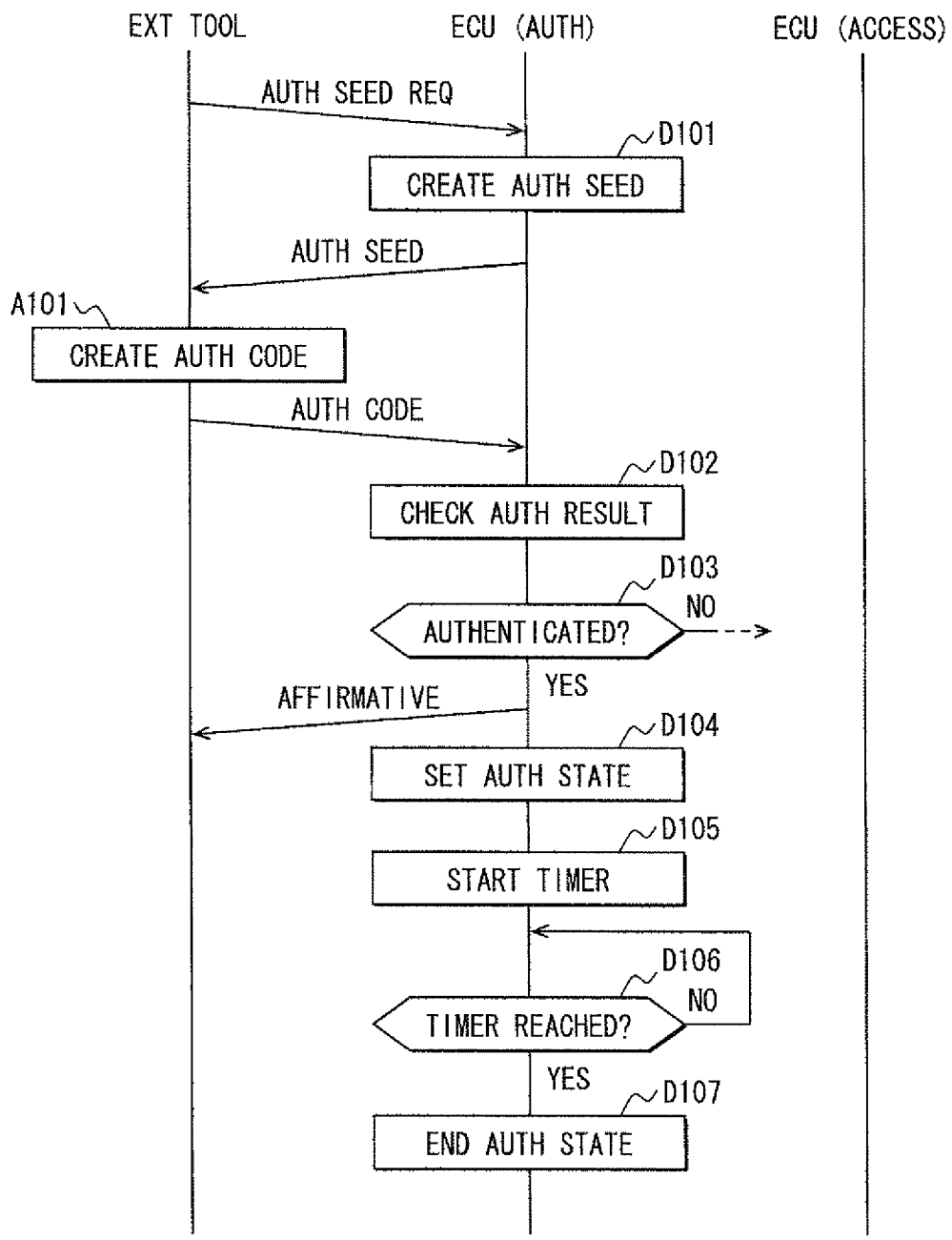
FIG. 13 is a sequence diagram illustrating operations of the third example of the first embodiment.

As shown in FIG. 13, in the authentication ECU 103, the control device 103a determines that the bus communication device 103b has received an authentication seed request command from the external tool 105 through the vehicular gateway apparatus 102, the control device 103a performs D101 to D103, which correspond to B101 to B103 performed by the vehicular gateway apparatus 102 as illustrated in the first example. When the control device 103a determines that a result of the authentication of the external tool 105 is affirmative (YES at D103), the control device 103a transmits an authentication result affirmative response command, which indicates that the result of the authentication is affirmative, to the external tool 105 by using the bus communication device 103b. Additionally, the control device 103a performs D104 to D107, which correspond to B104 and B112 to B114 performed by the vehicular gateway apparatus 102 of the first example. In the present example also, as is the cases in the first example, the authenticated state can be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the third example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the authentication ECU 103 performs the authentication of the external tool 105, sets the authenticated state and maintains the authenticated state, it is possible to omit the vehicular gateway apparatus 102. In the present example, the access target ECU 104 may include an authentication control device 104d and an authentication maintain device 104g, so that the authentication ECU 103 performs the authentication of the external tool 105 and that the access target ECU 104 sets and maintains the authenticated state. That is, the authentication of the external tool 105, the setting of the authenticated state, and the maintaining of the authenticated state may be decentrally performed by multiple ECUs.

(Fourth Example of First Embodiment)

A fourth example of the first embodiment will be described with reference to FIGS. 14 and 15. In the fourth example of the first embodiment, the vehicular gateway apparatus 102 is not connected with the bus 106. The authentication of the external tool 105, the setting of the authenticated state and the maintaining of the authenticated state are preformed by the access target ECU 104.

Figure 14:
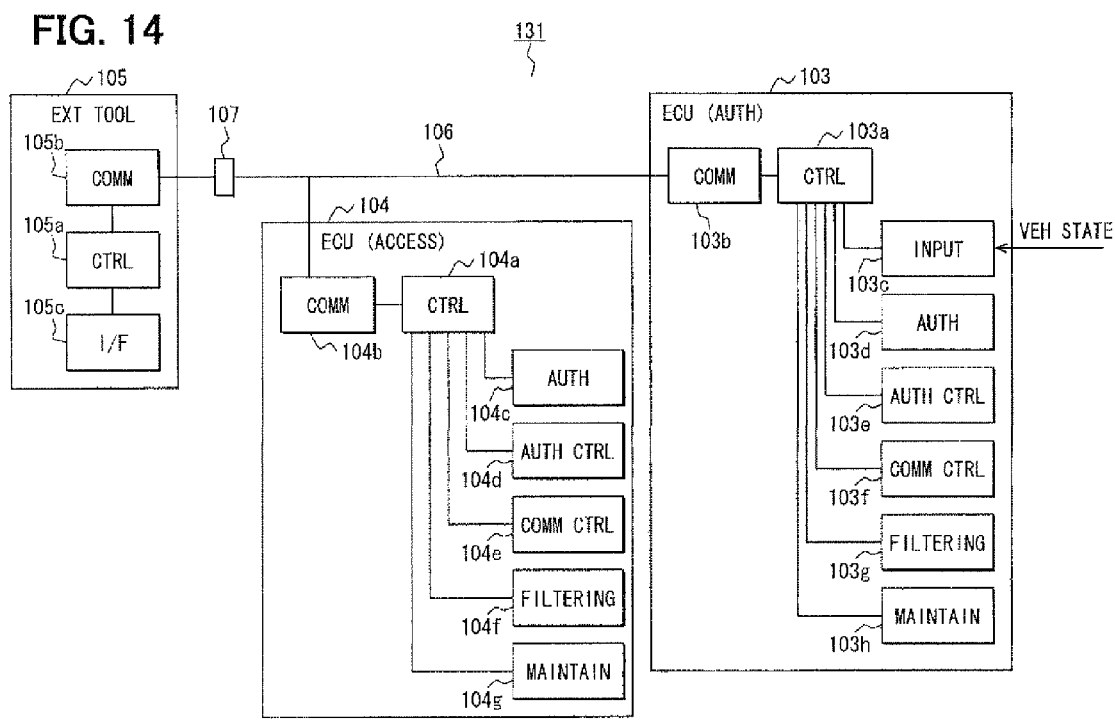
FIG. 14 is a functional block diagram illustrating a data communication authentication system of a fourth example of the first embodiment.

Specifically, as shown in FIG. 14, in a vehicular data communication authentication system 131, the access target ECU 104 includes an authentication device 104c, an authentication control device 104d, a communication control device 104e, a filtering device 104f, and an authentication maintain device 104g. The authentication device 104c, the authentication control device 104d, the communication control device 104e, the filtering device 104f and the authentication maintain device 104g, respectively, have substantially the same functions as the authentication device 102d, the authentication control device 102e, the communication control device 102f, the filtering device 102g and the authentication maintain device 102h illustrated in the first example.

Figure 15:
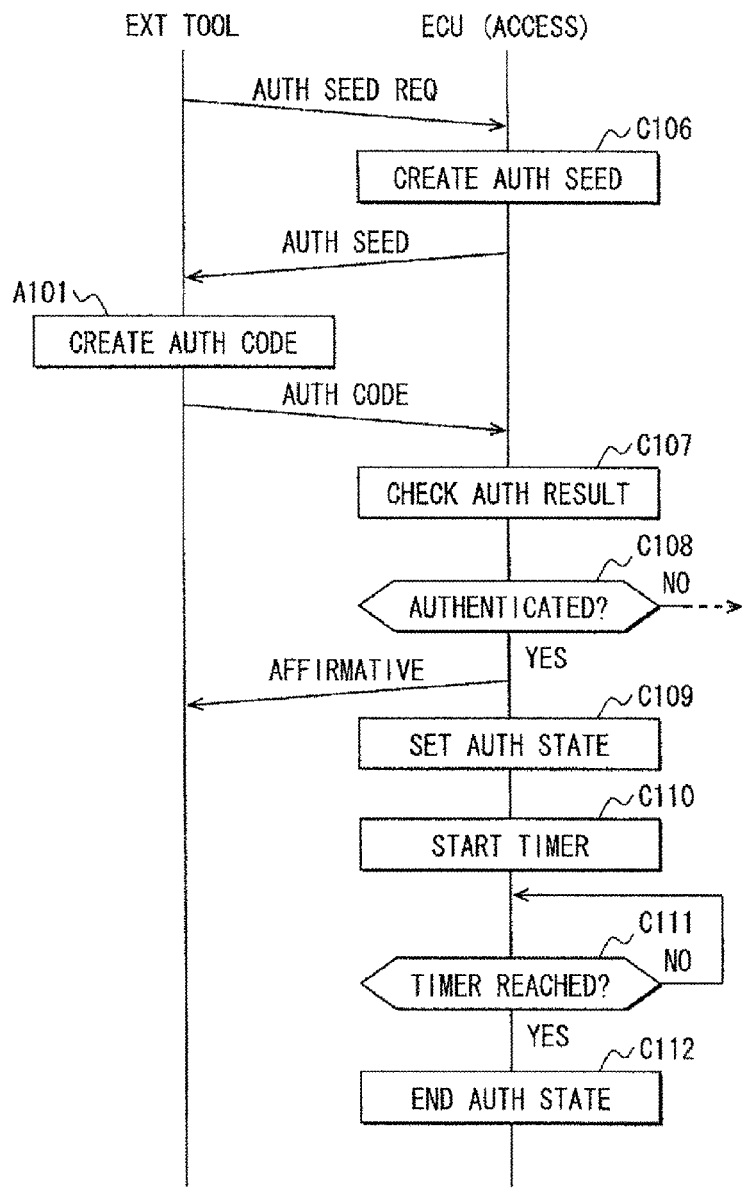
FIG. 15 is a sequence diagram illustrating operations of the fourth example of the first embodiment.

As shown in FIG. 15, when the control device 104a of the access target ECU 104 determines that the bus communication device 104b has received the authentication seed request command from the external tool 105, the control device 104a performs C106 to C112, which correspond to D101 to D107 performed by the authentication ECU 103 of the third example. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the fourth example, the period of maintaining the authenticated state is managed in a manner similar to that in the first example. Therefore, it is possible to avoid the unnecessary extension of the period of permitting the data communication between the external tool 105 and the access target ECU. As a result, after cutting off the connection of the external tool for example, it is possible to enhance the security. Additionally, since the access target ECU 104 performs the authentication of the external tool 105, sets the authenticated state and maintains the authenticated stat, it is possible to omit the vehicular gateway apparatus 102. In the present example, the authentication ECU 103 may include an authentication control device 103e and an authentication maintain device 103h, so that the access target ECU 104 performs the authentication of the external tool 105 and that the authentication ECU 103 sets and maintains the authenticated state. That is, the authentication of the external tool 105, the setting of the authenticated state and the maintaining of the authenticated state may be decentrally performed by multiple ECUs.

(Fifth Example of First Embodiment)

Figure 16:
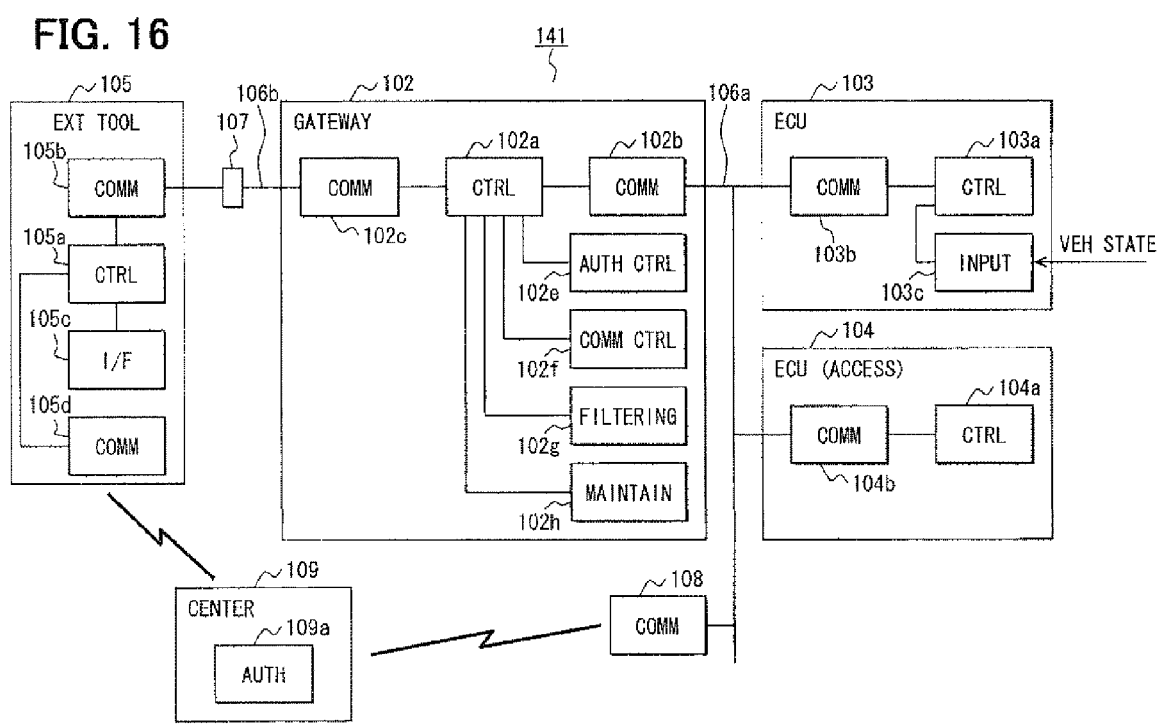
FIG. 16 is a functional block diagram illustrating a data communication authentication system of a fifth example of the first embodiment.

A fifth example of the first embodiment will be described with reference to FIGS. 16 and 17. As shown in FIG. 16, in the fifth example, a communication device 108 is connected with the ECU-side-bus 106a. Additionally, a center (sever) 109 communicable with the external tool 105 and the communication device 108 via a wide area communication network are present. The center 109 performs the authentication of the external tool 105, and the vehicular gateway apparatus 102 sets and maintains the authenticated state.

Specifically, in a vehicular data communication authentication system 141, the center 109 includes an authentication device 109a. The authentication device 109a is provided as a substitute for the authentication device 102d of the vehicular gateway apparatus 102 of the first example. The authentication device 109a has substantially the same function as the authentication device 102d illustrated in the first example.

Figure 17:
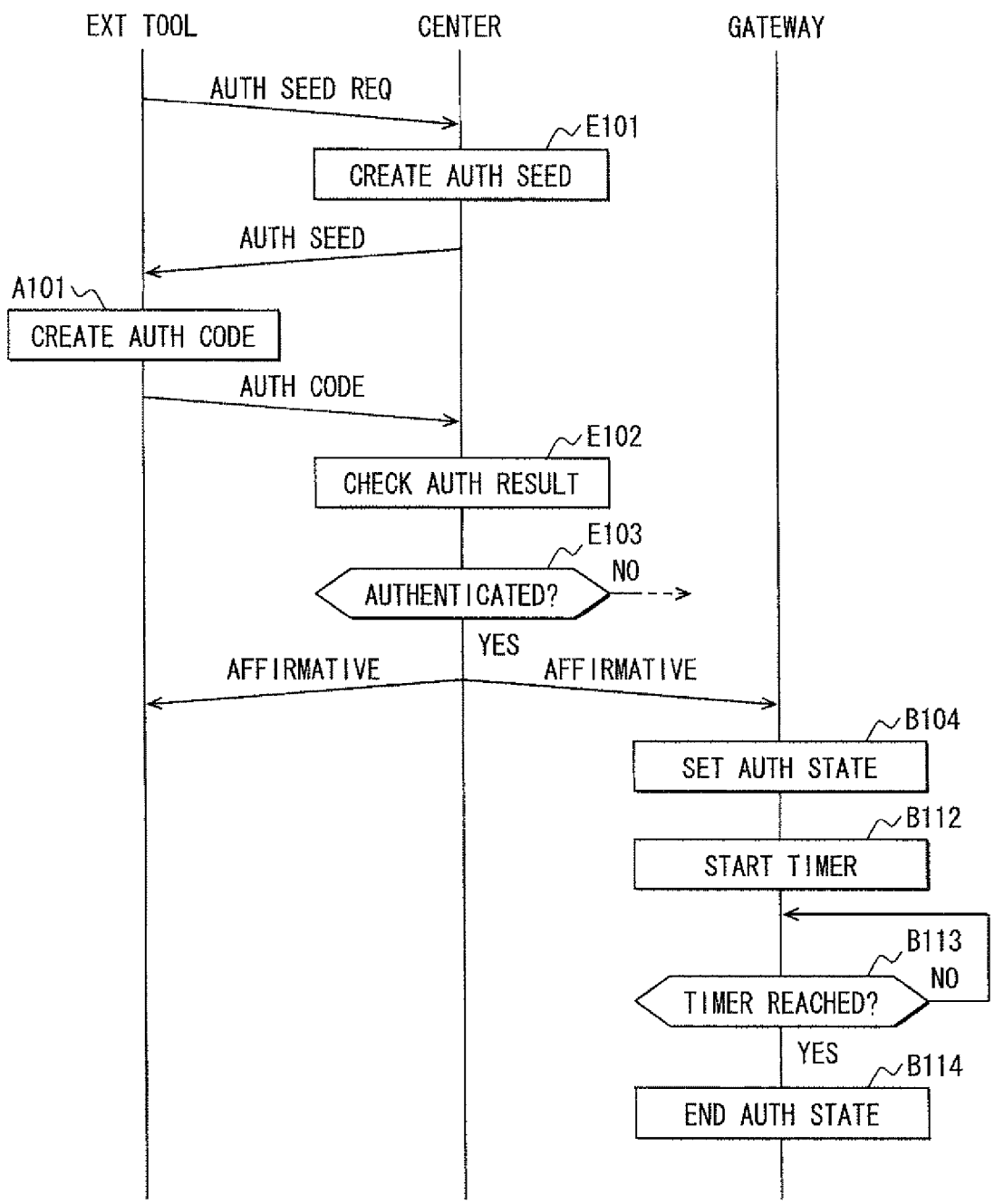
FIG. 17 is a sequence diagram illustrating operations of the fifth example of the first embodiment.

As shown in FIG. 17, when the center 109 determines that the center 109 has receives the authentication seed request command from the external tool 105, the center 109 performs E101 to E103, which correspond to B101 to B103 performed by the vehicular gateway apparatus 102 illustrated in the first example. When the center 109 determines that the result of the authentication of the external tool 105 is affirmative (YES at E103), the center 109 transmits the authentication result affirmative response command, which indicates that the result of the authentication is affirmative, to the external tool 105 and the communication device 108.

The control device 102a of the vehicular gateway apparatus 102 receives the authentication result affirmative response command from the center 109 through the communication device 108. When determining that the control device 102a receives the authentication result affirmative response command from the communication device 108, the control device 102a performs B104 and B112 to B114, which have been already illustrated in the first example. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the center 109 performs the authentication of the external tool 105 and since the vehicular gateway apparatus 102 sets and maintains the authenticated state, the authentication of the external tool 105, the setting of the authenticated state and the maintaining of the authenticated state are decentrally performed by the center 109 and the vehicular gateway apparatus 102. Additionally, since the center 109, which is located outside of the vehicular data communication authentication system 141, performs the authentication of the external tool 105, it is possible to perform high-security authentication by, for example, minutely updating the authentication seeds. Therefore, it is possible to further enhance security.

(Sixth Example of First Embodiment)

Figure 18:
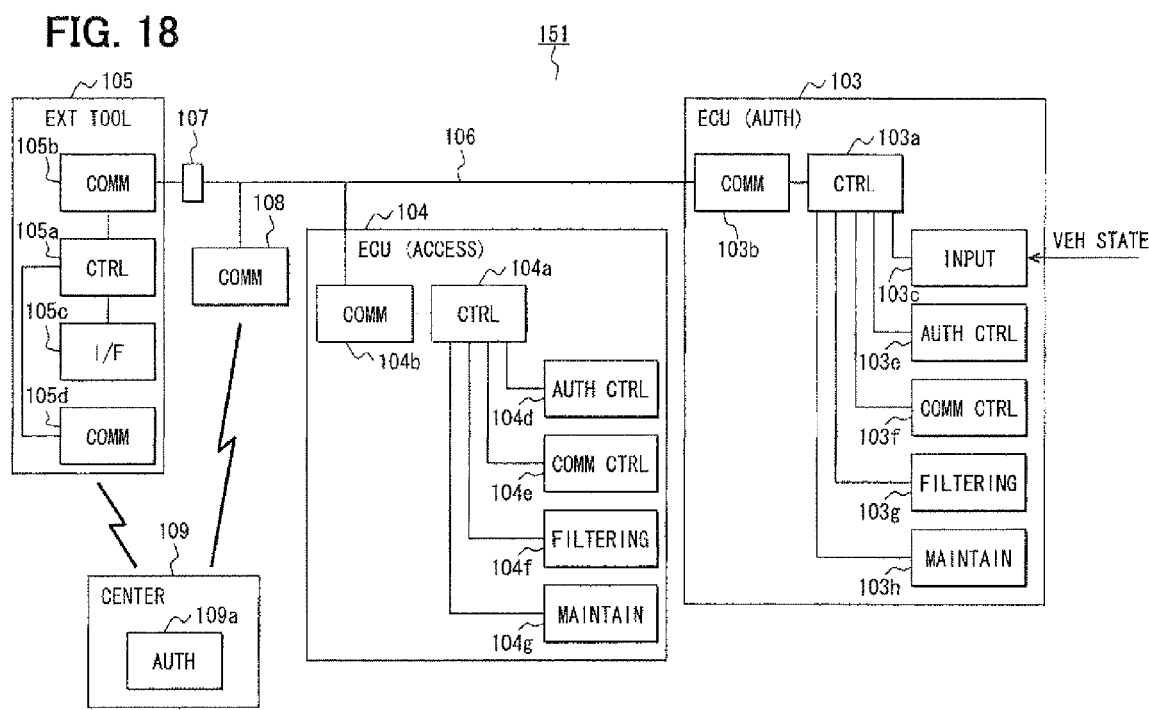
FIG. 18 is a functional block diagram illustrating a data communication authentication system of a sixth example of the first embodiment.

A sixth example of the first embodiment will be described with reference to FIGS. 18 and 19. As shown FIG. 18, in the sixth example, a communication device 108 is connected with the ECU-side-bus 106a. Additionally, a center (sever) 109 communicable with the external tool 105 and the communication device 108 through a wide area communication network is present. The center 109 performs the authentication of the external tool 105, and the authentication ECU 103 sets and maintains the authenticated state.

Figure 19:
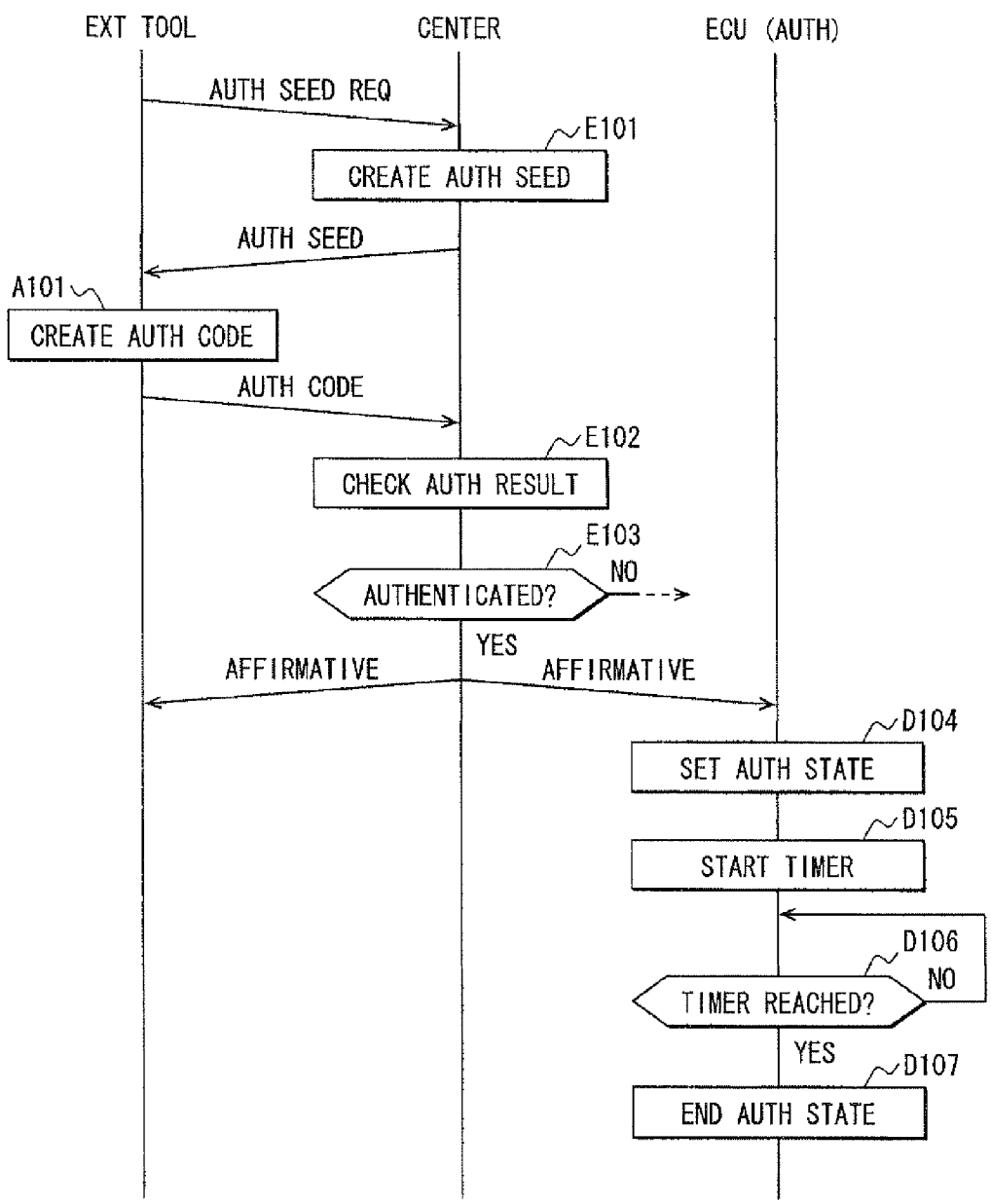
FIG. 19 is a sequence diagram illustrating operations of the sixth example of the first embodiment.

As shown in FIG. 19, when the center 109 determines that the center 109 has receives the authentication seed request command from the external tool 105, the center 109 performs E101 to E103, which correspond to B101 to B103 performed by the vehicular gateway apparatus 102 of the first example. When the center 109 determines that the result of the authentication of the external tool 105 is affirmative (YES at E103), the center 109 transmits the authentication result affirmative response command, which indicates that the result of the authentication is affirmative, to the external tool 105 and the communication device 108.

The control device 103a of the authentication ECU 103 receives the authentication result affirmative response command from the center 109 through the communication device 108. When determining that the control device 103a receives the authentication result affirmative response command from the communication device 108, the control device 103a performs D104 and D107 as illustrated in the second example. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the center 109 performs the authentication of the external tool 105 and since the authentication ECU 103 sets and maintains the authenticated state, the authentication of the external tool 105, the setting of the authenticated state and the maintaining of the authenticated state are decentrally performed by the center 109 and the authentication ECU 103. Additionally, since the center 109, which is located outside of a vehicular data communication authentication system 151, performs the authentication of the external tool 105, it is possible to perform high-security authentication by, for example, minutely updating the authentication seeds. Therefore, it is possible to further enhance security.

(Seventh Example of First Embodiment)

A seventh example will be described with reference to FIG. 20. In the seventh example, even in cases where it is impossible to directly perform the authentication of the external tool 105, the system enables indirect authentication of the external tool 105 by performing the authentication of the vehicle state. The seventh example can be achieved by using the same functional blocks (FIG. 1) as the first example.

Figure 20:
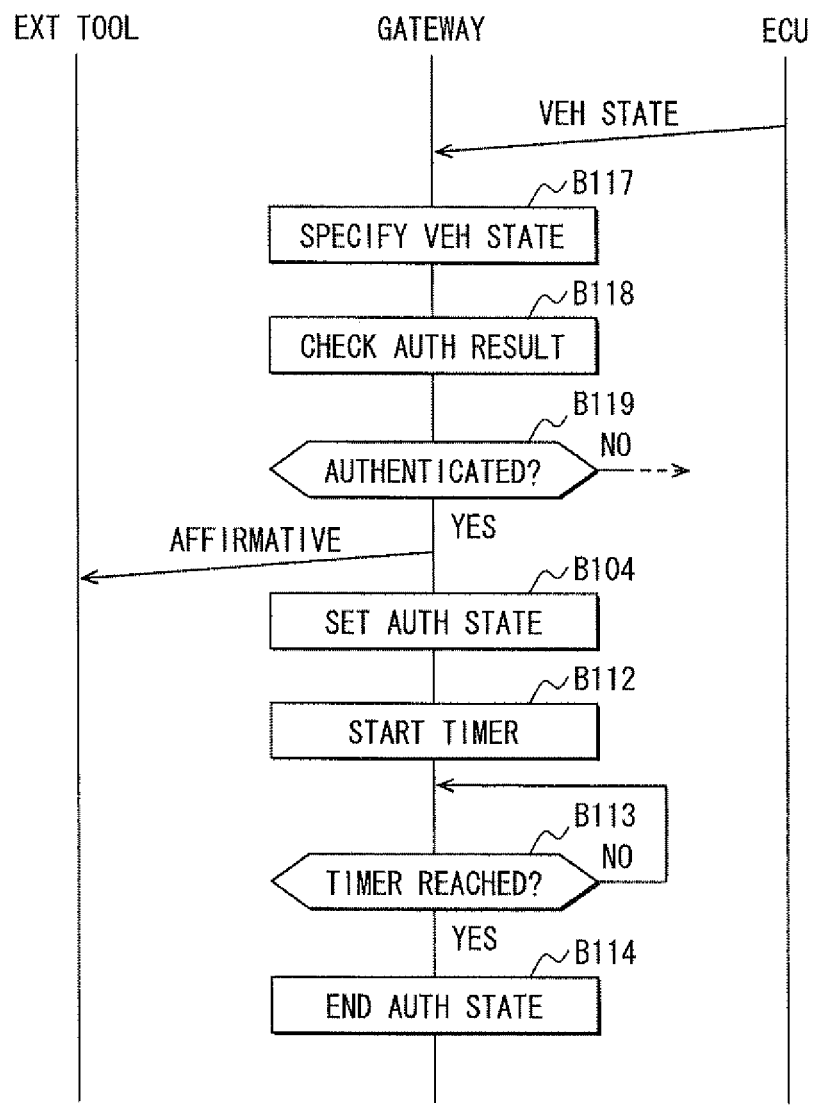
FIG. 20 is a sequence diagram illustrating operations of a seventh example of the first embodiment.

As shown in FIG. 20, the control device 102a of the vehicular gateway apparatus 102 receives the vehicle state from the ECU 103 through the ECU-side-bus communication device 102b, thereby specifying the vehicle state (B117). Then the control device 102a determines whether or not the vehicle state satisfies a predetermined condition, thereby performing the authentication of the vehicle state. In this way, the control device 102a determines whether a result of the authentication of the vehicle state is affirmative or negative (B118). For example, the control device 102a determines whether or not the immobilizer is in the unlocked state, whether or not the ignition switch is off, and whether or not the door is in the closed state.

Specifically, when a proper worker connects a proper external tool to the connector 107, the vehicle state is a normal state in which the immobilizer is in the released state (unlocked state), the ignition switch is off or the door is in the closed state. Thus, in the above situation, it is determined that the result of the authentication of the vehicle state is affirmative. However, when a third party having a bad intention connects a improper external tool to the connector 107, the vehicle state is a abnormal state in which the immobilizer is not in the released state; the ignition switch is not off; or the door is not the not-closed state. Thus, in the above situation, it is determined that the result of the authentication of the vehicle state is not affirmative.

In the gateway apparatus 102, when the control device 102a determines that the result of the authentication of the vehicle state is affirmative (YES at B119), the control device 102a performs B104. At B104, the control device 102a transmits an authentication result affirmative response command, which indicates that the result of the authentication is affirmative, to the external tool 105 by using the external-tool-side-bus communication device 102c. Additionally, the control device 102a sets the authenticated state, which is a state where the vehicle state is authenticated. Within a period during which the authenticated state is set, the control device 102a permits receipt of a data request command from the external tool 105 (permits the data communalization). Within a period during which the authenticated state is not set, the control device 102a prohibits the receipt of the data request command from the external tool 105 (prohibits the data communalization).

When the authenticated state is set in the above way (B104), the control device 102a performs B112 to B114 as illustrated in the first example. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the authenticating of the vehicle states, the setting of the authenticated state, and the maintaining of the authenticated state are collectively performed by the vehicular gateway apparatus 102, it is possible to achieve the above advantages by adding the vehicular gateway apparatus 102. Therefore, it is possible to achieve the above advantages while minimizing a change in an existing system.

(Eighth Example of First Embodiment)

An eighth example will be described with reference to FIG. 21. In the eighth example, the authentication ECU performs the authentication of the vehicle state and the vehicular gateway apparatus 102 sets and maintains the authenticated state. The eighth example can be achieved by using the same functional blocks (FIG. 10) as the second example.

Figure 21:
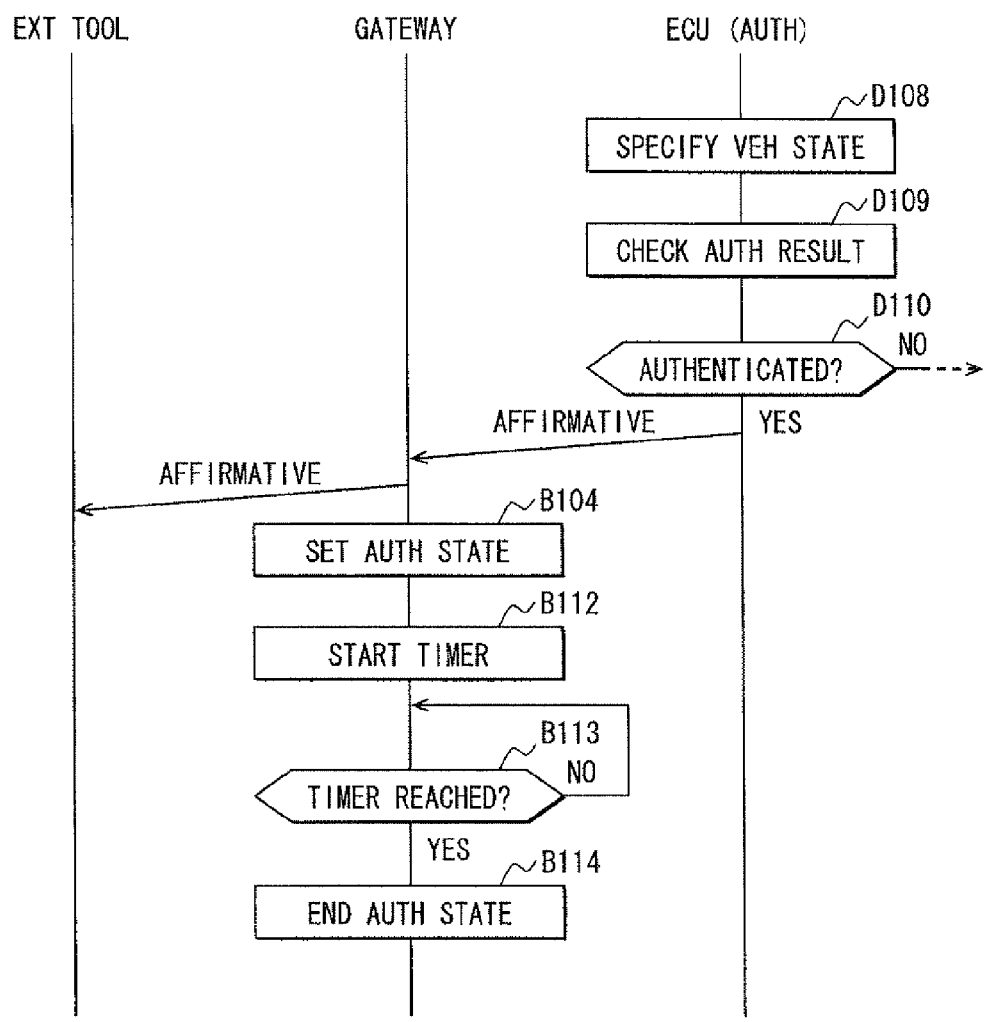
FIG. 21 is a sequence diagram illustrating operations of an eighth example of the first embodiment.

As shown in FIG. 21, the control device 103a of the authentication ECU 103 receives the vehicle state from an external, thereby specifying the vehicle state (D108). Then the control device 103a determines whether or not the vehicle state satisfies a predetermined condition, thereby performing the authentication of the vehicle state. In this way, the control device 102a determines whether a result of the authentication of the vehicle state is affirmative or negative (D109). The control device 103a determines that the result of the he authentication of the vehicle state is affirmative (YES at D110), the control device 103a transmits the authentication result affirmative response command, which indicates that the result of the authentication is affirmative, from the bus communication device 103b to the vehicular gateway apparatus 102.

When the control device 102a of the vehicular gateway apparatus 102 determines that the authentication result affirmative response command from the authentication ECU 103 is received by the ECU-side-bus communication device 102b, the control device 102a transmits the authentication result affirmative response command to the external tool 105 by using the external-tool-side communication device 102c. Thereafter, the control device 102a performs 8104, and 8112 to B114 as illustrated in the first example. In other words, the authentication ECU 103 performs the authentication of the vehicle state, and the vehicular gateway apparatus 102 sets the authenticated state, and maintains the authenticated state only within the predetermined period after the authenticated state was set. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security.

(Ninth Example of First Embodiment)

A ninth example will be described with reference to FIG. 22. In the ninth example, the authentication ECU 103 performs the authentication of the vehicle state, sets the authenticated state, and maintains the authenticated state. The ninth example can be achieved by using the same functional blocks (FIG. 12) as the third example.

Figure 22:
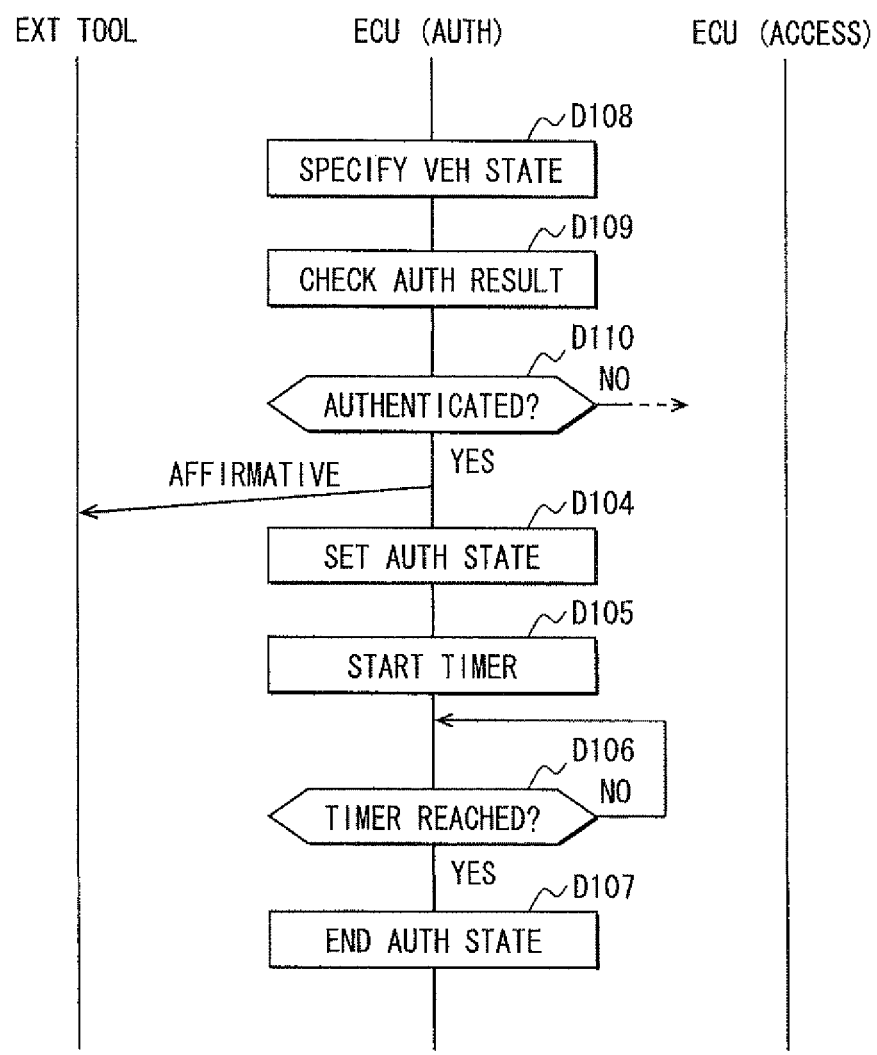
FIG. 22 is a sequence diagram illustrating operations of a ninth example of the first embodiment.

As shown in FIG. 22, the control device 103a of the authentication ECU 103 receives the vehicle state from an external and performs D108 to D110 as illustrated in the seventh example. When the control device 103a determines that the result of the authentication of the vehicle state is affirmative (YES at D110), the control device 103a transmits the authentication result affirmative response command, which indicates that the result of the authentication is affirmative, to the external tool 105 by using the bus communication device 103b. Thereafter, the control device 103a performs D104 to D107 as illustrated in the third example. In the present example also, as is the cases inn the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state. In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the authentication of the vehicle state, the setting of the authenticated state and the maintaining of the authenticated state are preformed by the authentication ECU 103, it is possible to omit the vehicular gateway apparatus 102. Alternatively, the access target ECU 104 may include an authentication control device 104d and an authentication maintain device 104g, so that the authentication ECU 103 performs the authentication of the vehicle state and that the access target ECU 104 sets and maintains the authenticated state. In other words, the authentication of the vehicle state, the setting of the authenticated state, and the maintaining of the authenticated state may be decentrally performed by multiple ECUs.

(Tenth Example of First Embodiment)

A tenth example will be described with reference to FIG. 23. In the tenth example, the access target ECU 104 performs the authentication of the vehicle state, sets the authenticated state, and maintains the authenticated state. The tenth example can be achieved by using the same functional blocks (FIG. 14) as the fourth example.

Figure 23:
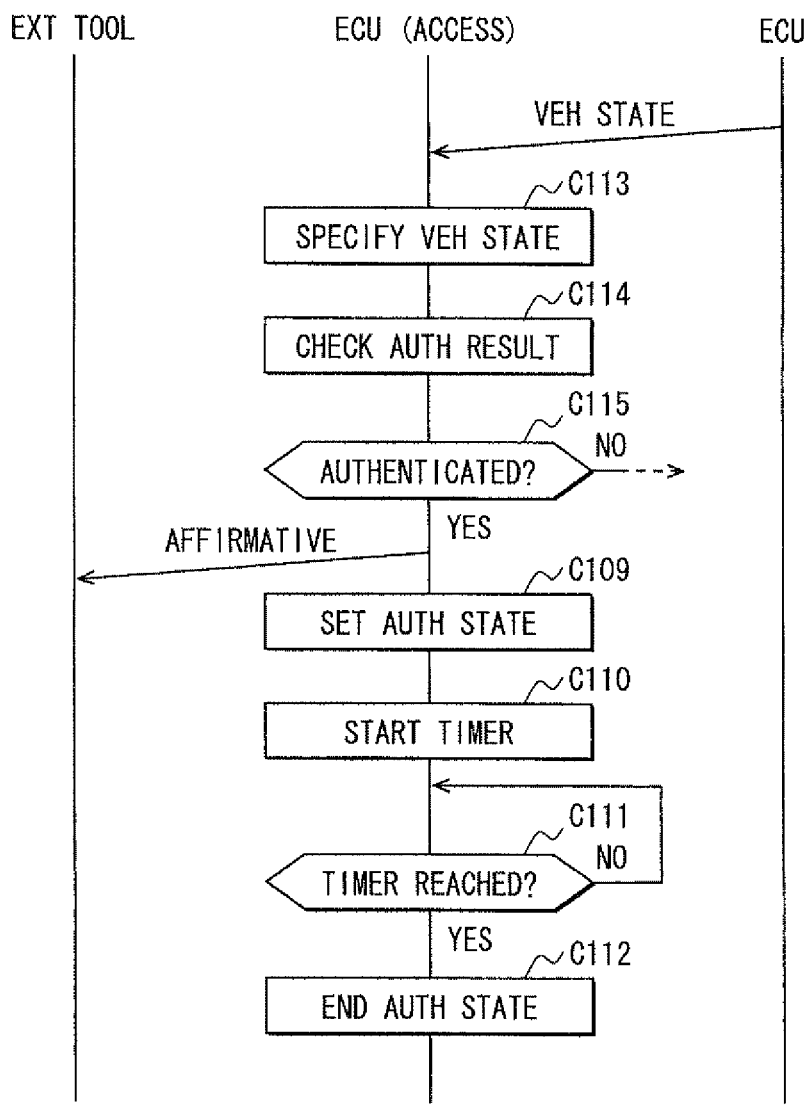
FIG. 23 is a sequence diagram illustrating operations of a tenth example of the first embodiment.

As shown in FIG. 23, the control device 104a of the access target ECU 104 receives the vehicle state from the ECU 103 through the bus communication device 104b, thereby specifying the vehicle state (C13). Then the control device 104a determines whether or not the vehicle state satisfies the predetermined condition, thereby performing the authentication of the vehicle state and determining whether or not a result of the authentication is affirmative or negative (C14). When the result of the authentication is affirmative (YES at C14), the control device 104a transmits the authentication result affirmative response command, which indicates that the result of the authentication is affirmative, to the external tool 105 by using the bus communication device 104b. Then the control device 104a performs C109 to C112 as illustrated in the fourth example. In the present example also, as is the cases in the first example, the authenticated state may be maintained, for example, only within: a period during which the authenticated state maintain request signal is inputted from the external such as the external tool 105, the authentication ECU 103 or the like; a period during which the vehicle state satisfies the predetermined condition; or a period during which the bus 106 is in the communicating state.

In the present example, the period of maintaining the authenticated state is managed in a manner similar to that in the first example. Therefore, after cutting off the connection of the external tool for example, it is possible to avoid the unnecessary extension of the period of permitting the data communication between the external tool 105 and the access target ECU. As a result, it is possible to enhance the security. Additionally, since the authentication of the vehicle state, the setting of the authenticated state and the maintaining of the authenticated state are preformed by the access target ECU 104, it is possible to omit the vehicular gateway apparatus 102. Alternatively, the authentication ECU 103 may include an authentication control device 103e and an authentication maintain device 103h, so that the access target ECU 104 performs the authentication of the vehicle state and that the authentication ECU 103 sets and maintains the authenticated state. That is, the authentication of the vehicle state, the setting of the authenticated state, and the maintaining of the authenticated state may be decentrally performed by multiple ECUs.

(Other Examples of First Embodiment)

The above-illustrated examples do not limit examples of the first embodiment. The first embodiment can be modified and extended in various ways. For example, when (i) the result of the authentication of the external tool 105 is affirmative and (ii) the result of the authentication of the vehicle state is affirmative, the authenticated state may be set. The vehicle state to be authenticate is not limited to the state (locked state, released stated) of the immobilizer, the state (on, off) of the initiation switch, and the state of the door (open state, closed state). Any state can be adopted as long as the state enable a determination as to whether or not a proper operator connects a proper external tool or an improper operator connects an improper external tool. Further, the determination may be used by using a single one of the states or by using a combination of the states. The filtering device 102g of the vehicular gateway apparatus 102, the filtering device 103g of the authentication ECU 103, and the filtering device 104f of the access target ECU 104 may be omissible.

(Second Embodiment)

Figure 24:
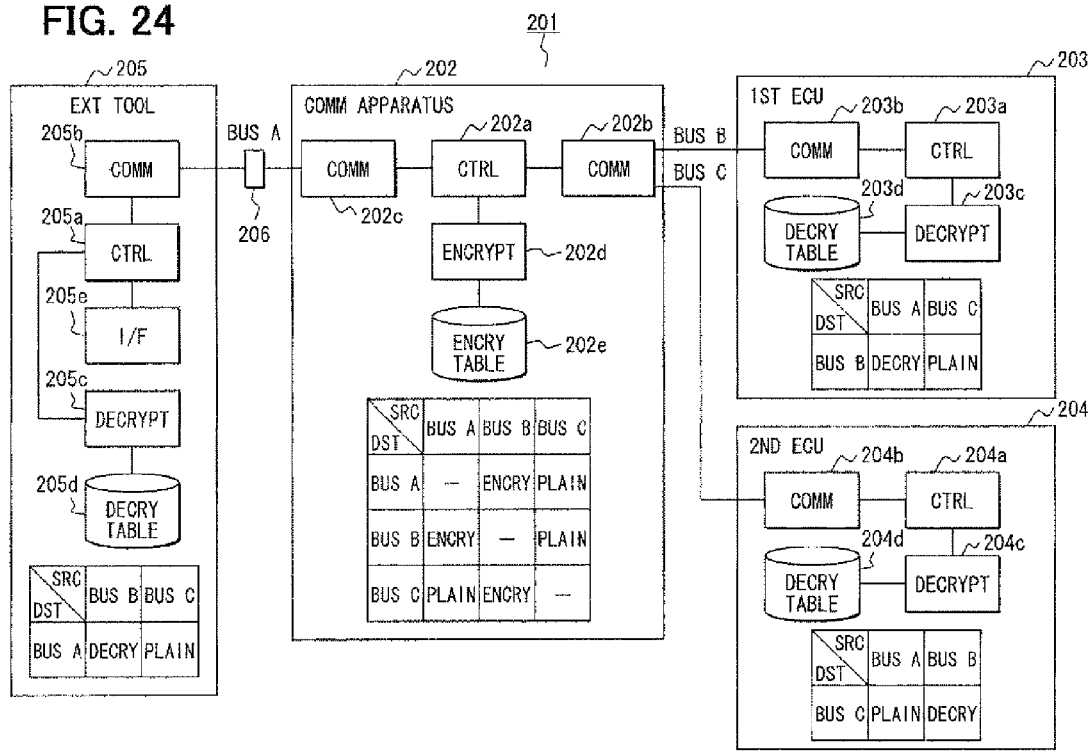
FIG. 24 is a functional block diagram illustrating a vehicular data communication system of a first example of a second embodiment.

A first example of the embodiment will be described with reference to FIGS. 24 to 27. As shown in FIG. 24, in a vehicular data communication system 201, a vehicular data communication apparatus 202 is connected with a bus so as to partition (separate) multiple ECUs including a first ECU 203 and a second ECU 204 from an external tool 205. Each of the ECUs and the external tool 205 serves as a node. The external tool 205 is operable by an operator. A bus connecting the vehicular data communication apparatus 202 and the external tool 205 is called a bus A. That is, the bus A is a bus for data transmission between the vehicular data communication apparatus 202 and the external tool 205. A bus connecting the vehicular data communication apparatus 202 and the first ECU 203 is called a bus B. That is, the bus B is a bus for data transmission between the vehicular data communication apparatus 202 and the first ECU 203. A bus connecting the vehicular data communication apparatus 202 and the second ECU 204 is called a bus C. That is, the bus C is a bus for data transmission between the vehicular data communication apparatus 202 and the second ECU 204. A connector 206, to which the external tool 205 is connectable, is provided on an external tool side of the bus A. When the external tool 205 is connected to the connector 206, the external tool 205 becomes able to communicate with the vehicular data communication apparatus 202.

The bus A, the bust B and the bus C adopt a control device area network (CAN) as a data communication method. The CAN communication defines a data field for storing a data, an identifier field for identifying type of a data frame, a cyclic redundancy check (CRC) field for storing CRC check, etc. However, in the CAN communication, a source field for identifying a source (source address) of a data frame and an authentication field for authenticating a data frame are not defined.

The vehicular data communication apparatus 202 includes a control device 202a (which can correspond to an example of encryption control device and means), an ECU-side-bus communication device 202b, an external-tool-side-bus communication device 202c, an encryption device 202d, and an encryption table 202e (which can correspond to an encryption information storage device or means). The control device 202a includes a microcomputer. By executing a control program with the microcomputer, the control device 202a controls operations of the ECU-side-bus communication device 202b, the external-tool-side-bus communication device 202c and the encryption device 202d. The ECU-side bus communication device 202b is connected with the bus B and the bus C, and controls data transmission and receipt between the first ECU 203 and the second ECU 204. The external-tool-side bus communication device 202c is connected with the bus A. In a state where the external tool 205 is connected to the connector 206, the external-tool-side bus communication device 202c controls communications, such as data transmission and receipt, with the external tool 205.

By referencing the encryption table 202e, the encryption device 202d references the encryption table 202e to encrypt and rewrite a plaintext data into an encrypted-text data. In the above, the plaintext data to be encrypted may be (i) a plaintext data which the external-tool-side bus communication device 202c receives from the external tool 205, and (ii) a plaintext data which the ECU-side-bus communication device 202b receives from the first ECU 203 or the second ECU 204. For each combination of a bus connected with a data source node and a bus connected with a data destination node, the encryption table 202e stores an encryption information. For example, as illustrated in FIG. 24, for the case where the bus connected with the data source node is the bus A and the bus connected with the data destination node is the bus B, the encryption table 202e stores the encryption information ("encr" in FIG. 24) indicating that the plaintext is to be encrypted. For the case where the bus connected with the data source node is the bus A and the bus connected with the data destination node is the bus C, the encryption table 202e stores the encryption information ("plain" in FIG. 24) indicating that the plaintext is not to be encrypted.

The first ECU 203 includes a control device 203a (which can correspond to an example of decryption control device and means), a bus communication device 203b, a decryption device 203c, and a decryption table 203d (which can correspond to an example of decryption information storage device and means). The control device 203a includes a microcomputer. By executing a control program with the microcomputer, the control device 203a controls the bus communication device 203b and the decryption device 203c. The bus communication device 203b is connected with the bus B and controls communication, such as data transmission and receipt, with the vehicular data communication apparatus 202.

The decryption device 203c decrypts an encrypted-text data received from the vehicular data communication apparatus 202, by rewriting the encrypted-text data into a plain text data when the bus communication device 203b receives the encrypted-text data from the vehicular data communication apparatus 202. For each bus connected with a data source node, the decryption table 203d stores decryption information. For example, as illustrated in FIG. 24, for the case where the bus connected with the data source node is the bus A, the decryption table 203d stores "decry" indicating that the encrypted-text data is to be decrypted. For the case where the bus connected with the source node is the bus C, the decryption table 203d stores "plain" indicating that the plain-text data is not to be decrypted.

The second ECU 204 has substantially the same configuration as the first ECU 203. The second ECU 204 includes a control device 204a (which can correspond to an example of decryption control device and means), a bus communication device 204b, a decryption device 204c, and a decryption table 204d (which can correspond to an example of decryption information storage device and means). The control device 204a includes a microcomputer. By executing a control program with the microcomputer, the control device 204a controls the bus communication device 204b and the decryption device 204c. The bus communication device 204b is connected with the bus C and controls communication, such as data transmission and receipt, with the vehicular data communication apparatus 202.

The decryption device 204c decrypts an encrypted-text data by rewriting the encrypted-text data into a plain text data when the bus communication device 204b receives the encrypted-text data from the vehicular data communication apparatus 202. For each bus connected with the data source node, the decryption table 204d stores decryption information. For example, as illustrated in FIG. 24, for the case where the bus connected with the data source node is the bust A, the information "plain" indicating that the plain-text data is not encrypted is stored. For the case where the bus connected with the data source node is the bus C, "the information decry" indicating that the encrypted-text data is to be decrypted is stored.

The external tool 205 includes a control device 205a (which can correspond to a decryption control device and means), a bus communication device 205b, a decryption device 205c, a decryption table 205d (which can correspond to a decryption information storage device and means), an input/output interface (IF) 205e. The control device 205a includes a microcomputer. By executing a control program with the microcomputer, the control device 205a controls operations of the bus communication device 205b, the decryption device 205c, and the input/output interface (IF) 205e. The bus communication device 205b is connected with the bus A and controls communication, such as data transmission and receipt, with the vehicular data communication apparatus 202.

The decryption device 205c decrypts an encrypted-text data by rewriting the encrypted-text data into a plain text data when the bus communication device 205b receives the encrypted-text data from the vehicular data communication apparatus 202. The decryption table 205d stores decryption information for each data bus connected with the data source node. For example, as illustrated in FIG. 24, for the case where the bus connected with the data source node is the bus B, the information "decry" indicating that the encrypted-text data is to be decrypted is stored. For the case where the bus connected with the data source node is the bus C, the information "plain" indicating that the plain-text data is not decrypted is stored.

The input/output IF 205e has a function to accept an input operation from the operator operating the external tool 205, and has a function to issue a notification by, for example, displaying a data. Specifically, by connecting the external tool 205 to the connector 206 and performing the input operation to the external tool 205, the operator can rewrite the control program of an access target ECU and read out a data from the access target ECU. The external tool 205 is not limited to a dedicated node for rewriting the control program of the access target ECU and reading out the data from the access target ECU but the external tool 205 may be a cellular phone, a personal digital assistance or the like having the above functions.

The encryption and decryption may use a public-key cryptography, in which the encryption is performed with a public-key and the decryption is performed with a private-key. Alternatively, the encryption and decryption may use a common-key cryptography, in which the encryption and decryption are performed with a common-key. Various ECUs may be used as the first ECU 203 and the second ECU 204. For example, the first ECU 203 or the second ECU 204 may be one of an engine ECU for controlling an engine, a door lock ECU for controlling operations of a door lock mechanism, a navigation ECU for controlling navigation operations, a meter ECU for controlling operations of a meter (indicator), and the like. For example, when the first ECU 203 or the second ECU 204 is the engine ECU, the first ECU 203 or the second ECU 204 includes a functional block for controlling the engine in addition to the above-described functional blocks. In the example shown in FIG. 24, the number of ECUs is two. However, the number of ECUs may be one, or more than two.

The encryption table and the decryption table are set up based on, for example, the following. Let us assume that the data transmitting through the bus can be classified into a regulation message (i.e., the message that gives obligation to answer in response to the request) and a non-regulation message (i.e., the message that does not give obligation to answer in response to the request). In this case, the encryption table and the decryption table are set up, so that (i) the information indicating that the encryption or decryption is not to be performed is set for the bus connected with the node that transmits and receives the regulation message, and (ii) the information indicating that the encryption or decryption is to be performed is set for the bus connected with the node that transmits and receives the non-regulation message.

Operations will be described with reference to FIGS. 25 to 28. In the following, three situations are illustrated. A first situation is that the external tool 205 and the first ECU 203 perform the data communication. A second situation is that the external tool 205 and the second ECU 204 perform the data communication. A third situation is that the first ECU 203 and the second ECU 204 perform the data communication.

(1) The First Situation (the External Tool 205 and the First ECU 203 Perform the Data Communication)

Figure 25:
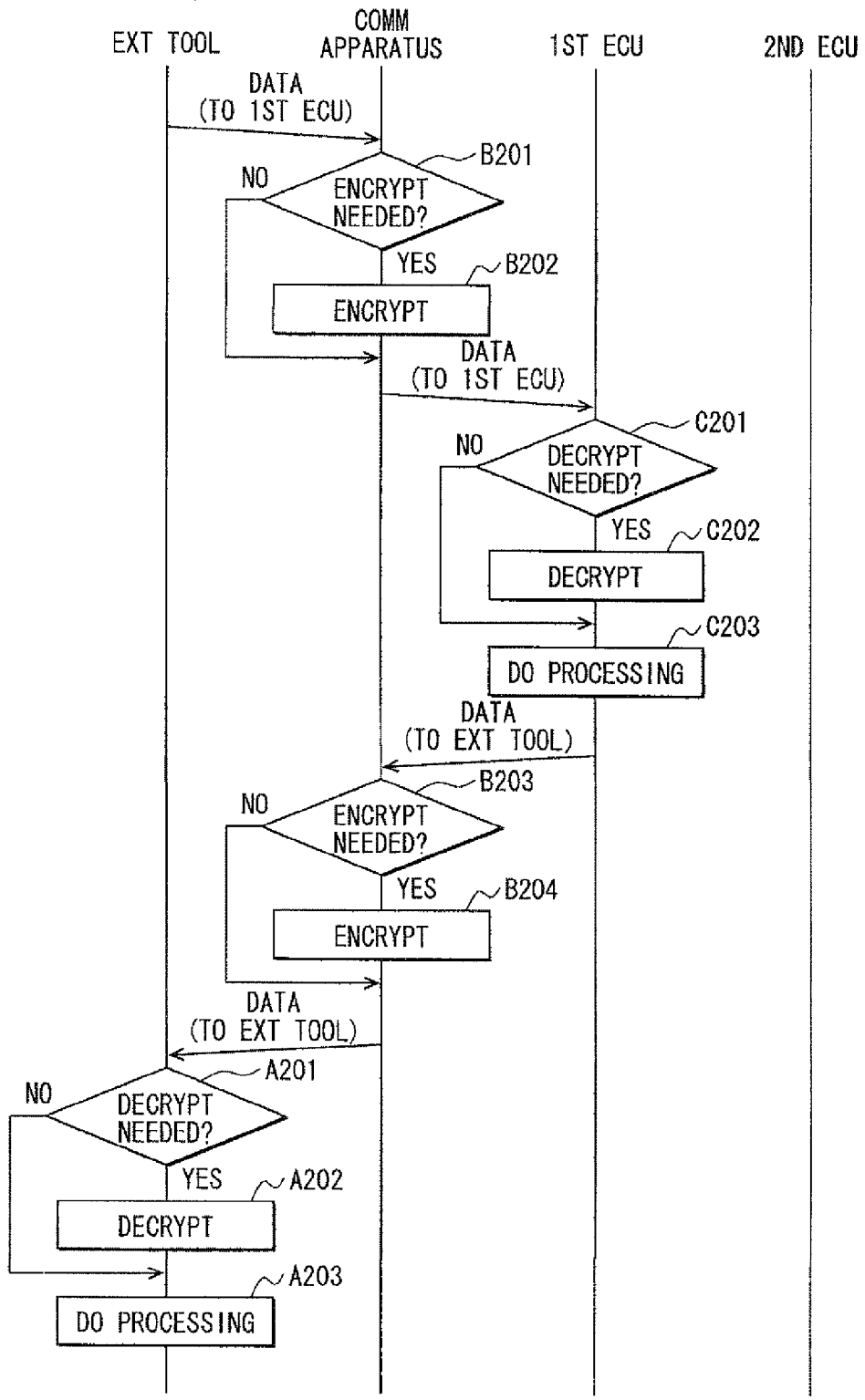
FIG. 25 is a sequence diagram illustrating operations in a first situation in accordance with the first example of the second embodiment.

In this situation, the processes illustrated in FIG. 25 are performed by the external tool 205, the first ECU 203, and the vehicular data communication apparatus 202. As illustrated in FIG. 25, when the external tool 205 is connected to the connector 206, the plain-text data is transmitted from the external tool 205 to the first ECU 203 (data destination node). In this case, when the control device 202a of the vehicular data communication apparatus 202 determines that the plain-text data is received by the external-tool-side-bus communication device 202c, the control device 202a determines whether or not it is necessary to encrypt the received plain-text data (B201). When the control device 202a determines that it is necessary to encrypt the received plain-text data (YES at B201), the control device 202a encrypts the plaintext data by using the encryption device 202d (B202), and transmits the encrypted-text data to the first ECU 203 by using the ECU-side-bus communication device 202b. When the control device 202a determines that it is not necessary to encrypt the plaintext data (NO at B201), the control device 202a transmits the plaintext data to the first ECU 203 by using the ECU-side-bus communication device 202b, without encrypting the plaintext data by using the encryption device 202d. In the present example, since "encry" is stored for a combination of the bus A connected with the source and the bus B connected with the destination, the control device 202a encrypts the plaintext data received from the external tool 205, and transmits the encrypted-text data to the first ECU 203.

When the control device 203a of the first ECU 203 determines that the bus communication device 203b has received the data, which is addressed to the first ECU 203, from the vehicular data communication apparatus 202, the control device 203a performs C201. At 0201, by referencing the decryption table 203d, the control device 203a determines whether or not it is necessary to decrypt the received data. When the control device 203a determines that it is necessary to decrypt the received data, in other words, when the control device 203a determines that the received data is the encrypted-text data (YES at 0201), the control device 203a decrypts the encrypted-text data (C202) and performs data processing based on the decrypted data. When the control device 203a determines that it is not necessary to decrypt the received data, in other words, when the control device 203a determines that the received data is the plaintext data (NO at C201), the control device 203a performs data processing based on the plaintext data without decrypting the plaintext data (C203). In the present example, since "decry" is stored for the bus A connected with the data source node, the control device 203a decrypts the encrypted-text data received from the vehicular data communication apparatus 202, and performs the data processing based on the plaintext data. Thereafter, the control device 203a transmits a plaintext data to the vehicular data communication apparatus 202 by using the bus communication device 203b.

When the control device 202a of the vehicular data communication apparatus 202 determines that the external-tool-side-bus communication device 202c has received the plain-text data, which is addressed to the external tool 205, from the external tool 205, the control device 202a performs B203. At B203, by referencing the encryption table 202e, the control device 202a determines whether or not it is necessary to encrypt the received plain-text data (B203). When the control device 202a determines that it is necessary to encrypt the received plain-text data (YES at 8203), the control device 202a encrypts the plaintext data by using the encryption device 202d (B204), and transmits the encrypted-text data to the external tool 205 by using the external-tool-side-bus communication device 202c. When the control device 202a determines that it is not necessary to encrypt the received plain-text data (NO at B203), the control device 202a transmits the plaintext data to the external tool 205 by using the external-tool-side-bus communication device 202c, without encrypting the plaintext data by using the encryption device 202d. In the present example, since "encry" is stored for a combination of the bus B on a source side and the bus A on a destination side, the control device 202a encrypts the plaintext data received from the first ECU 203, and transmits the encrypted-text data to the external tool 205.

When the control device 205a of the external tool 205 determines that the bus communication device 205b has received the data, which is addressed to the external tool 205, from the vehicular data communication apparatus 202, the control device 205a performs A201. At A201, by referencing the decryption table 205d, the control device 205a determines whether or not it is necessary to decrypt the received data. When the control device 205a determines that it is necessary to decrypt the received data, in other words, when the control device 205a determines that the received data is the encrypted-text data (YES at A201), the control device 205a decrypts the encrypted-text data (A202) and performs data processing based on the decrypted data (A203). When the control device 205a determines that it is not necessary to decrypt the received data, in other words, when the control device 203a determines that the received data is the plaintext data (NO at A201), the control device 203a performs data processing based on the plaintext data without decrypting the plaintext data (A203). In the present example, since "decry" is stored for the bus B on the source side, the control device 205a decrypts the decrypted-text data received from the vehicular data communication apparatus 202 to obtain a plaintext data and performs the data processing based on the plaintext data As described above, the vehicular data communication apparatus 202 stores "encry" for the combination of the bus A on the data source side and the bus B on the data destination side. Thus, upon receipt of the plaintext data from the external tool 205, the vehicular data communication apparatus 202 encrypts the received plaintext data into a decrypted-text data and transmits the decrypted-text data to the first ECU 203. Moreover, the vehicular data communication apparatus 202 stores "encry" for the combination of the bus B on the data source side and the bus A on the data destination side. Thus, upon receipt of the plaintext data from the first ECU 203, the vehicular data communication apparatus 202 encrypts the received plaintext data into a decrypted-text data and transmits the decrypted-text data to the external tool 205.

(2) The Second Situation (the External Tool 205 and the Second ECU 204 Perform the Data Communication)

Figure 26:
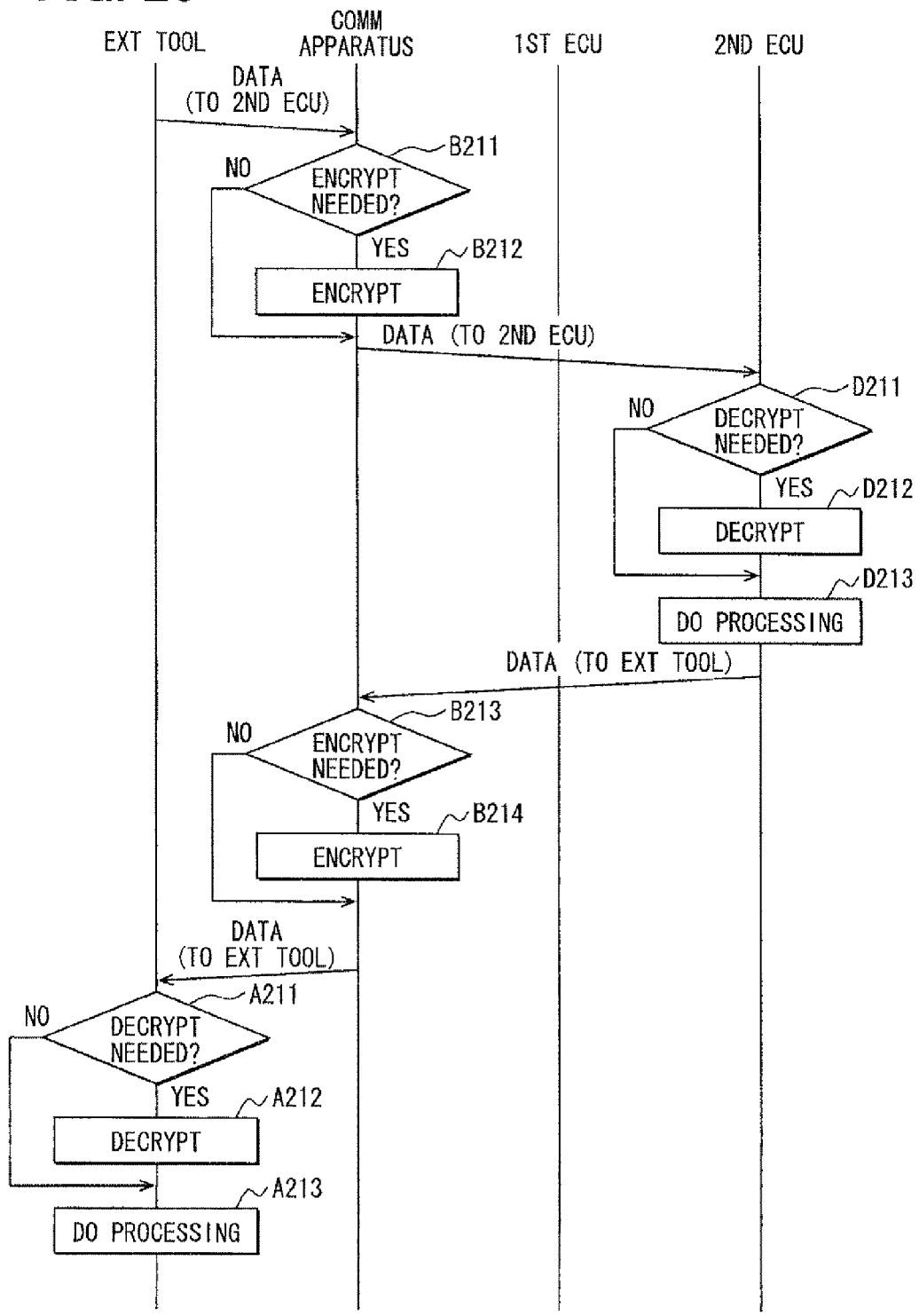
FIG. 26 is a sequence diagram illustrating operations in a second situation in accordance with the first example of the second embodiment.

As shown in FIG. 26, the vehicular data communication apparatus 202 performs step B211 and 8212, and then, the second ECU 204 performs D211 to D213, and then the vehicular data communication apparatus 202 performs B213 and B214, and then the external tool 205 performs A211 to A213. In the present example, the vehicular data communication apparatus 202 stores "plain" for the combination of the bus A on the data source side and the bus C on the data destination side. Thus, upon receipt of the plaintext data from the external tool 205, the vehicular data communication apparatus 202 transmits the received plaintext data to the second ECU 204 without encrypting the received plain-text data. Moreover, the vehicular data communication apparatus 202 stores "plain" for the combination of the bus C on the data source side and the bus A on the data destination side. Thus, upon receipt of the plaintext data from the second ECU 204, the vehicular data communication apparatus 202 transmits the received plaintext data to the external tool 205 without encrypting the received plain-text data.

(3) The Third Situation (the First ECU 203 and the Second ECU 204 Perform the Data Communication).

Figure 27:
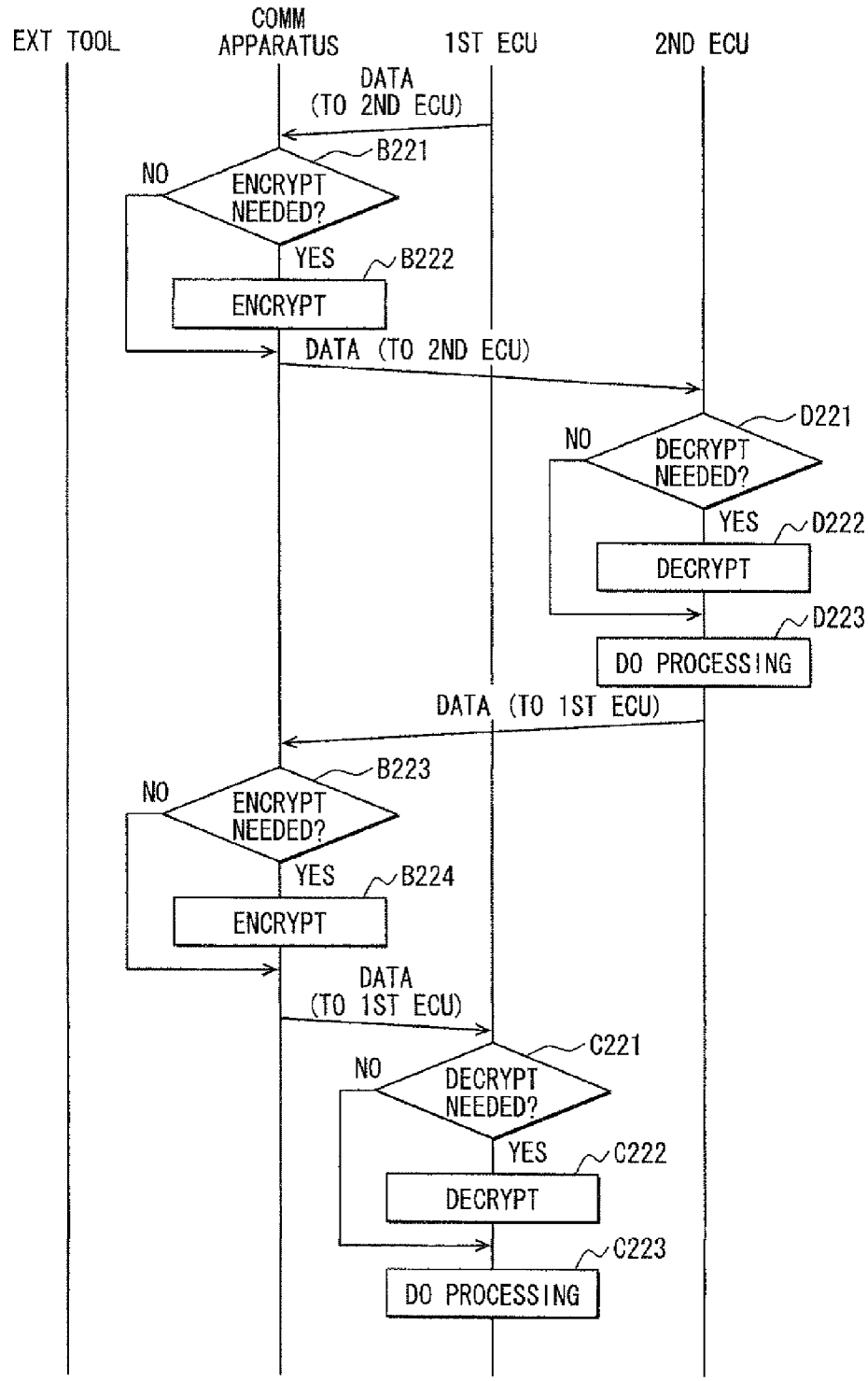
FIG. 27 is a sequence diagram illustrating operations in a third situation in accordance with the first example of the second embodiment.

As shown in FIG. 27, the vehicular data communication apparatus 202 performs step B221 and B222, and then, the second ECU 204 performs D221 to D223, and then the vehicular data communication apparatus 202 performs B223 and B224, and then the first ECU 203 performs C221 to C223. In the present example, the vehicular data communication apparatus 202 stores "encry" for the combination of the bus B on the data source side and the bus C on the data destination side. Thus, upon receipt of the plaintext data from the first ECU 203, the vehicular data communication apparatus 202 encrypts the received plaintext data into a decrypted-text data and transmits the decrypted-text data to the second ECU 204. Moreover, the vehicular data communication apparatus 202 stores "plain" for the combination of the bus C on the data source side and the bus B on the data destination side. Thus, upon receipt of the plaintext data from the second ECU 204, the vehicular data communication apparatus 202 transmits the received plaintext data to the first ECU 203 without encrypting the received plaintext data.

In the first example, the vehicular data communication apparatus 202 relays a data among the external tool 205, the first ECU 203 and the second ECU 204. For each combination of a bus connected with a data source node and a bus connected with a data destination node, the encryption information (the encryption table) indicating whether or not the data is to be encrypted is uniformly managed by the vehicular data communication apparatus 202. Additionally, for each bus connected with the data source node, the decryption information (the decryption table) indicating whether or not the data is to be decrypted is uniformly managed by the external tool 205, the first ECU 203 and the second ECU 204.

Accordingly, to transmit the data, the external tool 205, the first ECU 203 and the second ECU 204 are not required to encrypt the data. Thus, the external tool 205, the first ECU 203 and the second ECU 204 can transmit the data without encrypting the data. Additionally, it is sufficient for each of the external tool 205, the first ECU 203 and the second ECU 204 to store the decryption table associated with only the data that is transmitted from the vehicular data communication apparatus 202 to the each. Therefore, a configuration complication and a processing increase resulting from the encryption and the decryption can be prevented. For example, it is possible to use a processing capacity (e.g., a memory capacity), which is not unlimited, for a primary function, and it is possible to ensure fulfilling the primary function. It should be noted that if the encryption or the decryption causes the failure to fulfill the primary function (e.g., processing delay), a negative influence may be give on, for example, vehicle control during the vehicle traveling. Therefore, the configuration of the present example is remarkably advantageous in a system in which the ECU serves as a node. Moreover, since the vehicular data communication apparatus 202 performs the data encryption, it is possible to enhance the security in data communication. Specifically, even if an improper external tool is connected to the bus, a data transmitted from the improper external tool is not supported by the encryption of the vehicular data communication apparatus 202, and thus, it becomes possible to prevent the improper rewriting of the control programs of the first ECU 203 and the second ECU 204 and the improper reading out of the first ECU 203 and the second ECU 204.

Moreover, even when multiple nodes transmitting a data needed to be encrypted are connected with the same bus and/or even when multiple nodes transmitting a data unneeded to be encrypted are connected with the same bus, an encryption table and/or an decryption table targeted for respective individual nodes are not required to be set up. Instead, the encryption table and/or the decryption table targeted for respective individual nodes are set up. Therefore, a work for setting up the encryption table and/or the decryption table is simple.

Figure 28:
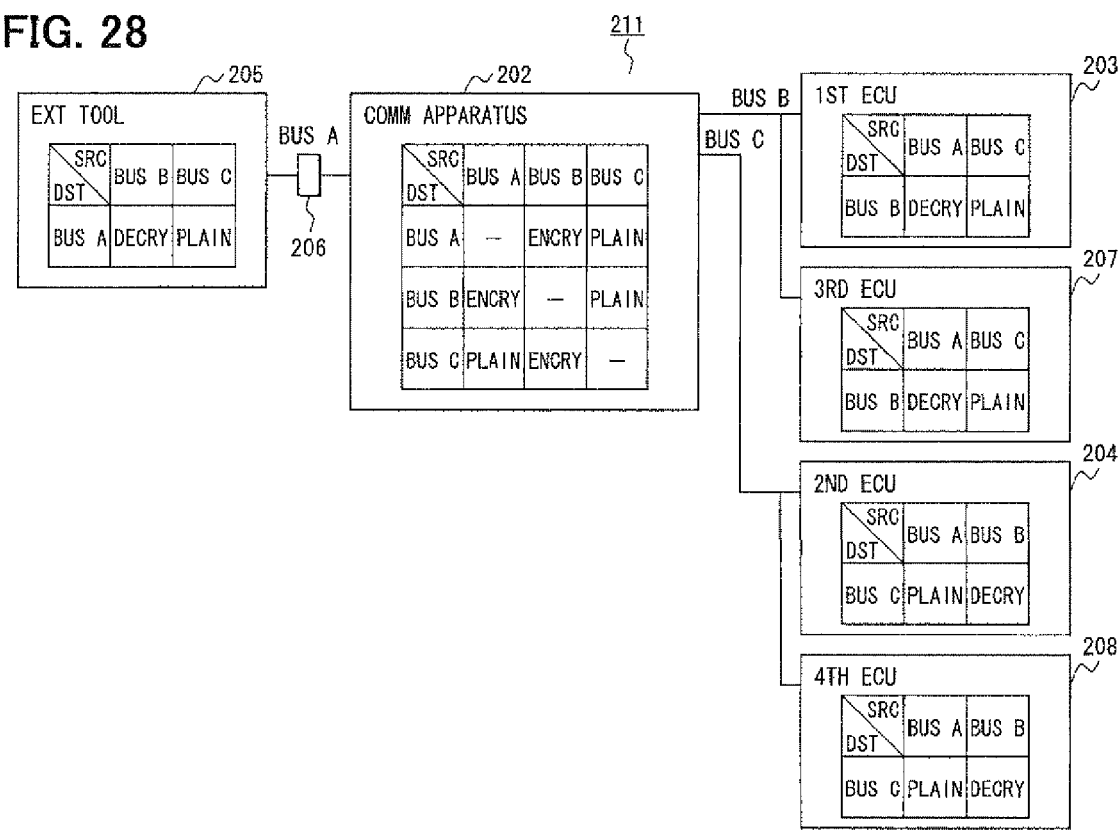
FIG. 28 is a block diagram illustrating a encryption table and a decryption table in accordance with the first example of the second embodiment.

Although the above illustration is directed to the system in which the first ECU 203 is connected with the vehicular data communication apparatus 202 through the bus B, ideas of the above illustration are applicable to a system in which multiple ECUs including the first ECU 203 are connected with the vehicular data communication apparatus 202 through the bus B. Specifically, as shown in FIG. 28, in the vehicular data communication system 211, the first ECU 203 and a third ECU 207 may be connected with the vehicular data communication apparatus 202 through the bus B. In this configuration, the third ECU 207 stores the same decryption table as the first ECU 203 stores, so that the third ECU 207 can performs substantially the same process as the first ECU 203. It should be noted that when the first ECU 203 and the third ECU 207 perform the data communication, the encryption table stored in the vehicular data communication apparatus 202 is not used, because the vehicular data communication apparatus 202 does not relay the data. The same is applied to cases where the second ECU 204 and the fourth ECU 208 are connected with the vehicular data communication apparatus 202 through the bus C.

(Second Example of Second Embodiment)

Figure 29:
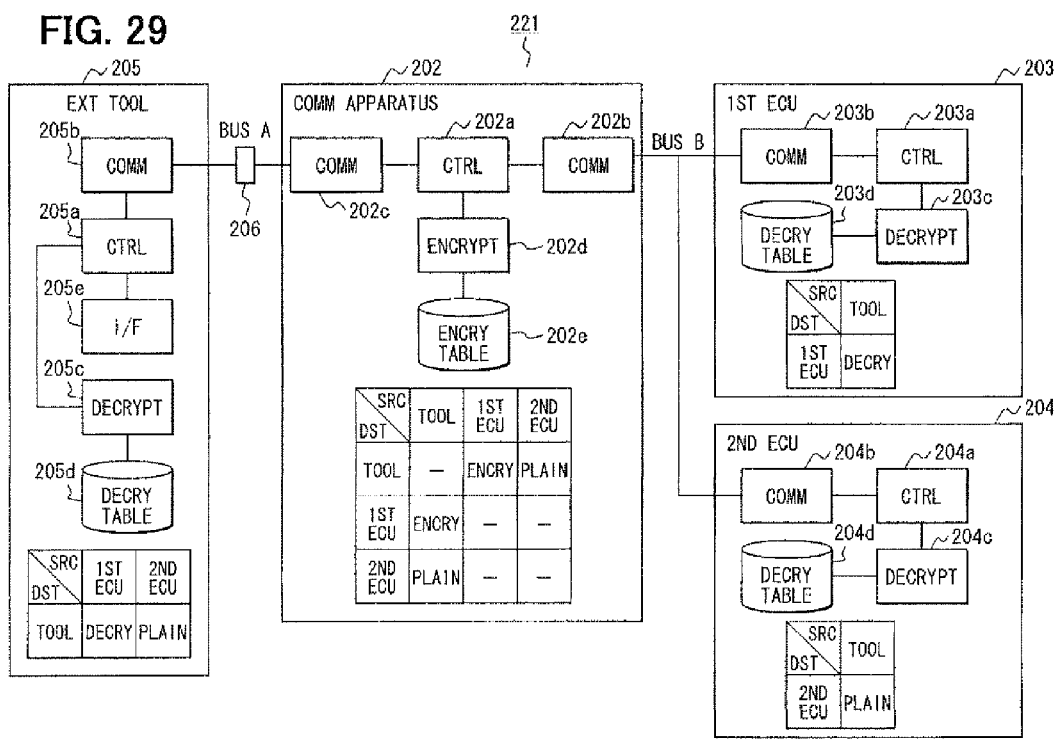
FIG. 29 is a functional block diagram illustrating a vehicular data communication system of a second example of the second embodiment.
Figure 30:
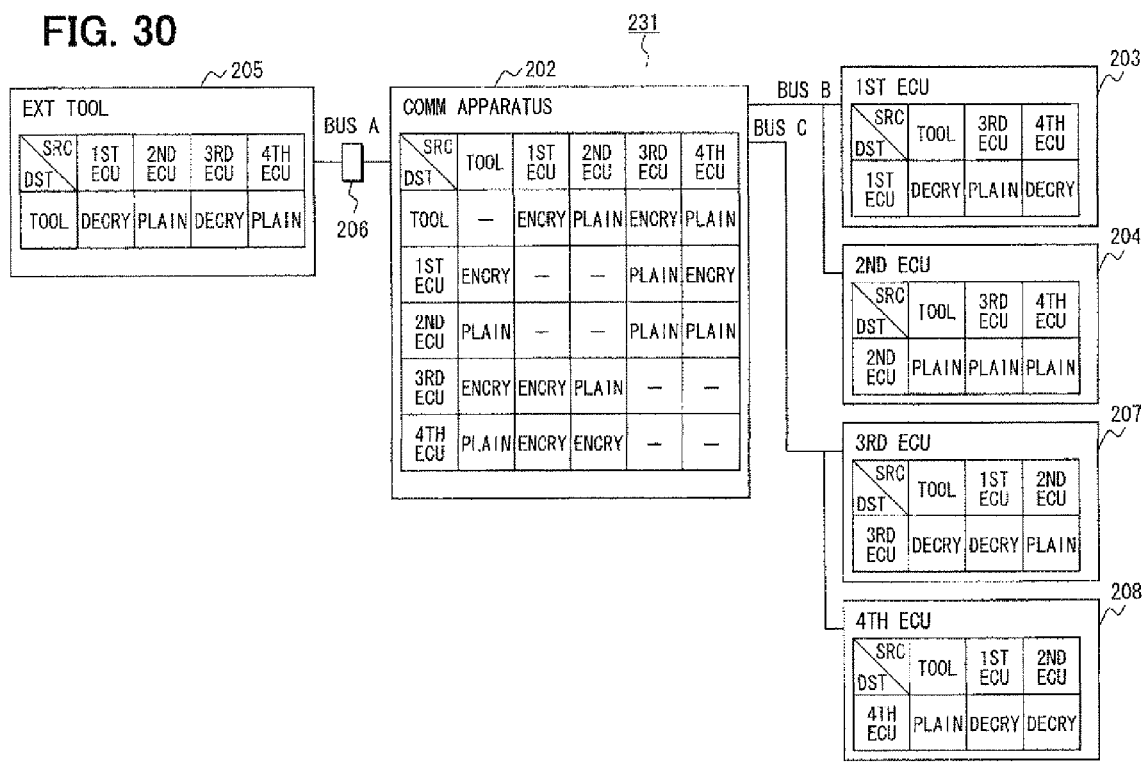
FIG. 30 is a block diagram illustrating a encryption table and a decryption table in accordance with the second example of the second embodiment.

A second example of the second embodiment will be described with reference to FIGS. 29 and 30. In the second example, for each combination of a data source node and a data destination node, the encryption table is uniformly managed by the vehicular data communication apparatus 202 relaying a data. For each data source node, the decryption table is uniformly managed by the external tool 205, the first ECU 203, and the second ECU 204. In the second example, for example, the information indicating that the decryption or the encryption is not to be performed is set for a node that transmits and receives a non-regulation message. The information indicating that the decryption or the encryption is to be performed is set for a node that transmits and receives a regulation message.

In a vehicular data communication system 221, the vehicular data communication apparatus 202 is connected with the first ECU 203 and the second ECU 204 through the bus B. The vehicular data communication apparatus 202 stores the encryption information as the encryption table 202e for each combination of a data source node and a data destination node. For example, as illustrated in FIG. 29, for the case where the data source node is the external tool 205 and the data destination node is the first ECU 203, the stored encryption information indicates that the plaintext data is to be encrypted. For the case where the data source node is the external tool 205 and the data destination node is the second ECU 204, the stored encryption information indicates that the plaintext data is not to be encrypted For each data source node, the first ECU 203 stores the decryption information as the decryption table 203d. For example, as illustrated in FIG. 29, for the case where the data source node is the external tool 205, the stored decryption information indicates that the encrypted-text data is to be decrypted. Likewise, for each data source node, the second ECU 204 stores the decryption information as the decryption table 204d. For example, as illustrated in FIG. 29, for the case where the data source node is the external tool 205, the stored decryption information indicates that the plaintext data is not to be decrypted. Likewise, for each data source node, the external tool 205 stores the decryption information as the decryption table 205d. For example, as illustrated in FIG. 29, for the case where the data source node is the first ECU 203, the stored decryption information indicates that the encrypted-text data is to be decrypted. For the case where the data source node is the second ECU 204, the stored decryption information indicates that the plain-text data is not to be decrypted.

In the second example, the vehicular data communication apparatus 202 relays a data among the external tool 205, the first ECU 203 and the second ECU 204. For each combination of a data source node and a data destination node, the vehicular data communication apparatus 202 uniformly manages the encryption information (the encryption table) indicating whether or not the data is to be encrypted. Additionally, for each data source node, the decryption information (the decryption table) indicating whether or not the data is to be decrypted is uniformly managed by the external tool 205, the first ECU 203 and the second ECU 204.

Accordingly, the second example of the second embodiment can provide substantially the same advantages as the first example of the second embodiment. Specifically, to transmit the data, the external tool 205, the first ECU 203 and the second ECU 204 are not required to encrypt the data. Thus, the external tool 205, the first ECU 203 and the second ECU 204 can transmit the data without encrypting the data. Additionally, it is sufficient for each of the external tool 205, the first ECU 203 and the second ECU 204 to store the decryption table associated with only the data that is transmitted from the vehicular data communication apparatus 202 to the each. Therefore, a configuration complication and a processing increase resulting from the encryption and the decryption can be prevented. Moreover, since the vehicular data communication apparatus 202 performs the data encryption, it is possible to enhance the security in data communication.

Moreover, even when multiple nodes transmitting a data needed to be encrypted are connected with the same bus and/or even when multiple nodes transmitting a data unneeded to be encrypted are connected with the same bus, it is possible to appropriately encrypt only the data needed to be encrypted, by setting the encryption tables and/or the decryption tables for respective individual nodes. Additionally, it is possible to flexibly deal with node addition and node deletion.

The above illustration is directed to the system in which the first ECU 203 and the second ECU 204 are connected with the vehicular data communication apparatus 202 through the bus B. However, ideas of the above illustration are applicable to a system in which multiple ECUs including the first ECU 203 and the second ECU 204 are connected with the vehicular data communication apparatus 202 through multiple buses including the bus B. For example, as illustrated in FIG. 30, in a vehicular data communication system 231, the first ECU 203 and the second ECU 204 are connected with the vehicular data communication apparatus 202 through the bus B, and additionally, the third ECU 207 and the fourth ECU 208 are connected with the vehicular data communication apparatus 202 through the bus C. In this case, the vehicular data communication apparatus 202 stores the encryption table by designating the third ECU 207 and the fourth ECU 208 as the data source node and the data destination node. Each of the first ECU 203, the second ECU 204 and the external tool 205 stores the decryption table by designating the third ECU 207 and the fourth ECU 208 as the data source node.

(Third Example of Second Embodiment)

Figure 31:
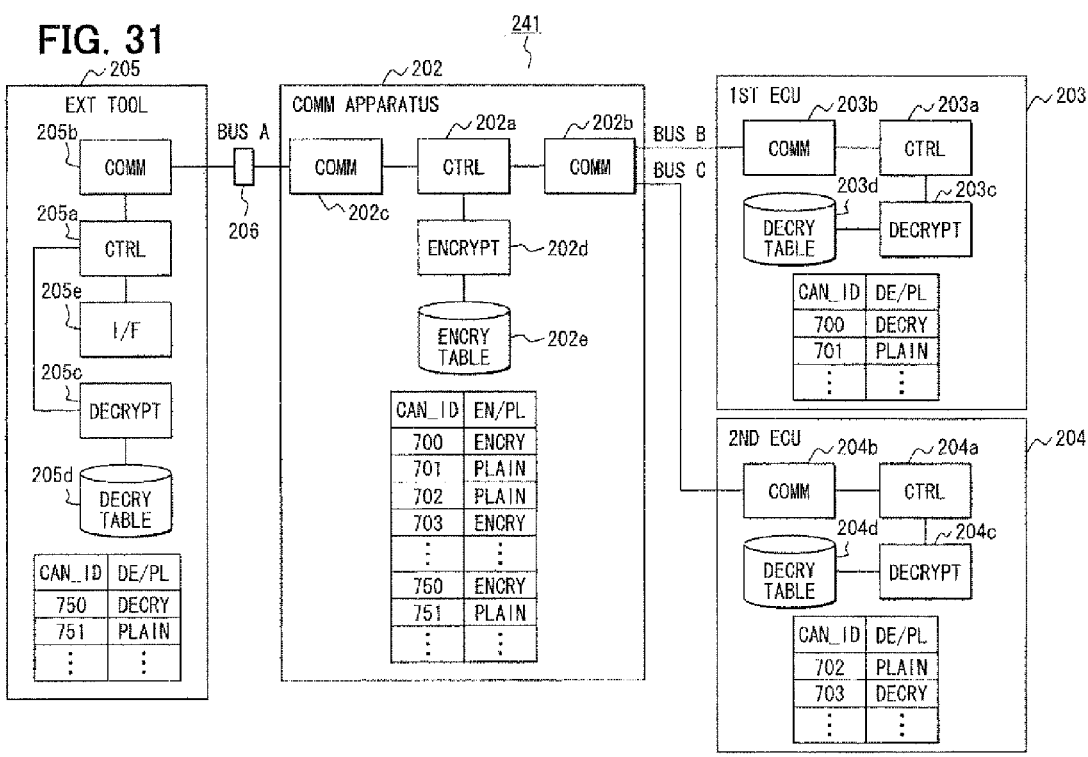
FIG. 31 is a functional block diagram illustrating a vehicular data communication system of a third example of the second embodiment.
Figure 32:
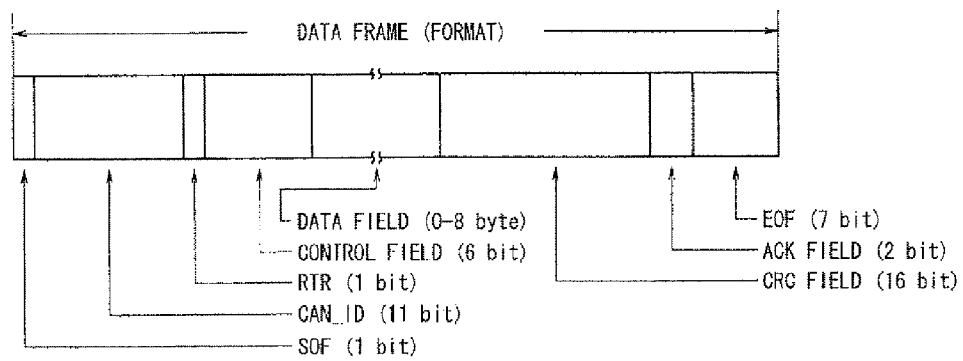
FIG. 32 is a diagram illustrating a configuration of a data frame.

A third example of the second embodiment will be described with reference to FIGS. 31 and 32. In the third example, the vehicular data communication apparatus 202 for relaying a data uniformly manages the encryption table for each identifier (CAN_ID) indicative of type of a data frame storing a data. For each identifier (CAN_ID) indicative of type of a data frame storing a data, the decryption table is uniformly managed by the external tool 205, the first ECU 203 and the second ECU 204. In the third example, for example, the information indicating that the decryption or the encryption is not to be performed is set for the CAN_ID of the data frame having the regulation message. The information indicating that the decryption or the encryption is not to be performed is set for the CAN_ID of the data frame having the non-regulation message. The CAN_ID refers to information identifying data content or the like, and has 11-bit length in standard format, as illustrated in FIG. 32.

In a vehicular data communication system 241, for each CAN_ID indicative of the type of the data frame, the vehicular data communication apparatus 202 stores the encryption as the encryption table 202_e_. For example, as illustrated in FIG. 31, for the case where the data frame has the CAN_ID "700", the stored encryption information indicates that the plaintext data is to be encrypted. For the case where the data frame has the CAN_ID "701", the stored encryption information indicates that the plaintext data is not to be encrypted.

For each CAN_ID indicative of the type of the data frame, the first ECU 203 stores the decryption information as the decryption table 203_d_. For example, as illustrated in FIG. 31, for the case where the data frame has the CAN_ID "700", the stored decryption information indicates that the plaintext data is to be decrypted. For the case where the data frame has the CAN_ID "701", the stored encryption information indicates that the plaintext data is not to be decrypted. Likewise, the second ECU 204 stores, for each CAN_ID indicative of the type of the data frame, the decryption information as the decryption table 204_d_. The external tool 205 also stores, for each CAN_ID indicative of the type of the data frame, the decryption information as the decryption table 205_d_.

In the third example, the vehicular data communication apparatus 202 relays a data among the external tool 205, the first ECU 203 and the second ECU 204. For each CAN_ID, the vehicular data communication apparatus 202 uniformly manages the encryption information (the encryption table) indicating whether or not the data is to be encrypted. Additionally, for each CAN_ID, the decryption information (the decryption table) indicating whether or not the data is to be decrypted is uniformly managed by the external tool 205, the first ECU 203 and the second ECU 204.

Accordingly, the third example of the second embodiment can provide substantially the same advantages as the first example of the second embodiment. Specifically, to transmit the data, the external tool 205, the first ECU 203 and the second ECU 204 are not required to encrypt the data. Thus, the external tool 205, the first ECU 203 and the second ECU 204 can transmit the data without encrypting the data. Additionally, it is sufficient for each of the external tool 205, the first ECU 203 and the second ECU 204 to store the decryption table associated with only the data that is transmitted from the vehicular data communication apparatus 202 to the each. Therefore, a configuration complication and a processing increase resulting from the encryption and the decryption can be prevented. Moreover, since the vehicular data communication apparatus 202 performs the data encryption, it is possible to enhance the security in data communication.

Moreover, by setting the encryption tables and the decryption tables for respective individual data frames, it is possible to appropriately encrypt only the data needed to be encrypted, even when the same single node transmits both of the data frame storing the data needed to be encrypted and the data frame storing the data unneeded to be encrypted.

(Fourth Example of Second Embodiment)

Figure 33:
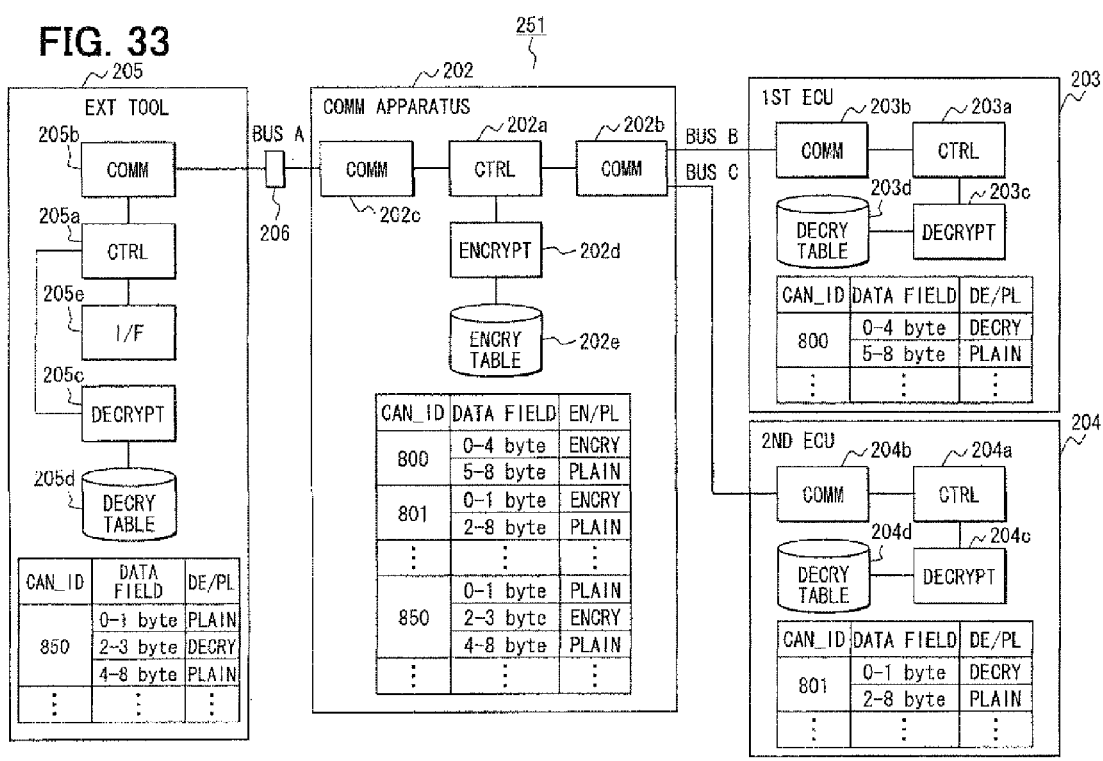
FIG. 33 is a functional block diagram illustrating a vehicular data communication system of a fourth example of the second embodiment.

A fourth example of the second embodiment will be described with reference to FIG. 33. In the fourth example, the vehicular data communication apparatus 202 for relaying a data uniformly manages the encryption table for each data storage area (data field) of a data frame storing a data. For each data storage area (data field) of a data frame storing a data, the decryption table is uniformly managed by the external tool 205, the first ECU 203 and the second ECU 204. In the fourth example, for example, the information indicating that the decryption or the encryption is not to be performed is set for the data storage area of the data frame having the regulation message. The information indicating that the decryption or the encryption is not to be performed is set for the data storage area of the data frame having the non-regulation message.

In a vehicular data communication system 251, for each data storage area of the data frame, the vehicular data communication apparatus 202 stores the encryption as the encryption table 202e. For example, as illustrated in FIG. 33, for a plaintext data stored in "0 to 4 byte" of the data field of the data frame having "800" as the CAN_ID, the stored encryption information indicates that the plaintext data is to be encrypted. For a plaintext data stored in "5 to 8 byte", the stored encryption information indicates that the plaintext data is not to be encrypted.

For each data storage area of the data frame, the first ECU 203 stores the decryption information as the decryption table 203d. For example, as illustrated in FIG. 33, for an encrypted-text data stored in "0 to 4 byte" of the data field of the data frame having "800" as the CAN_ID, the stored decryption information indicates that the encrypted-text data is to be decrypted. For a plaintext data stored in "5 to 8 bytes", the stored decryption information indicates that the plaintext data is not to be decrypted. Likewise, the second ECU 204 stores, for each data storage area of the data frame, the decryption information as the decryption table 204d. The external tool 205 also stores, for each data storage area of the data frame, the decryption information as the decryption table 205d.

In the fourth example, the vehicular data communication apparatus 202 relays a data among the external tool 205, the first ECU 203 and the second ECU 204. For each data field (for each data storage area of the data frame), the vehicular data communication apparatus 202 uniformly manages the encryption information (the encryption table) indicating whether or not the data is to be encrypted. Additionally, for each data field (for each data storage area of the data frame), the data destination node uniformly manages the decryption information (the decryption table) indicating whether or not the data is to be decrypted. The data destination node is, for example, the external tool 205, the first ECU 203 and the second ECU 204.

Accordingly, the third example of the second embodiment can provide substantially the same advantages as the first example of the second embodiment. Specifically, to transmit the data, the external tool 205, the first ECU 203 and the second ECU 204 are not required to encrypt the data. Thus, the external tool 205, the first ECU 203 and the second ECU 204 can transmit the data without encrypting the data. Additionally, it is sufficient for each of the external tool 205, the first ECU 203 and the second ECU 204 to store the decryption table associated with only the data that is transmitted from the vehicular data communication apparatus 202 to the each. Therefore, a configuration complication and a processing increase resulting from the encryption and the decryption can be prevented. Moreover, since the vehicular data communication apparatus 202 performs the data encryption, it is possible to enhance the security in data communication.

Moreover, by setting the encryption tables and the decryption tables for respective individual data storage areas, it is possible to appropriately encrypt only the data needed to be encrypted, even when the node transmits the data frame having both of the data needed to be encrypted and the data unneeded to be encrypted.

(Other Examples of Second Embodiment)

The second embodiment is not limited to the above-illustrated examples, and can be modified and extended in, for example, the following way. Two or more of the first to fourth examples may be combined. Specifically, the system may employ the tow or more of: a configuration in which the encryption information and the decryption information are managed on a bus-by-bus basis; a configuration in which the encryption information and the decryption information are managed on a node-by-node basis; a configuration in which the encryption information and the decryption information are managed on a CAN_ID-by-CAN_ID basis; and a configuration in which the encryption information and the decryption information are managed on a data-field-by-data-field basis. Some of the multiple ECUs may have some of the functions of the vehicular data communication apparatus 202. Specifically, the vehicular data communication apparatus 202 is not limited to a dedicated apparatus for encrypting a data by determining whether or not to encrypt the data. For example, an ECU having a high processing capacity may be provided in the system, so that, while fulfilling its primary function, the ECU encrypts a data by determining whether or not to encrypt the data.

The present disclosure is not limited the above embodiments and modifications thereof. That is, the above embodiments and modifications thereof may be modified in various ways without departing from the sprit and scope of the present disclosure.

What is claimed is:

1. A vehicular data communication authentication system in which an external tool is connectable to a bus connected with electronic control units (ECUs) including an access target ECU, the vehicular data communication authentication system comprising:
   an authentication device that performs authentication of the external tool connected to the bus;
   an authentication control device that:
   determines whether or not a result of the authentication of the external tool performed by the authentication device is affirmative;
   when determining that the result of the authentication of the external tool is affirmative, sets an authenticated state as a state in which the external tool is authenticated;
   permits a data communication between the external tool and the access target ECU as long as the authenticated state is set;
   when determining that the result of the authentication of the external tool is not affirmative, does not set the authenticated state; and
   prohibits the data communication between the external tool and the access target ECU as long as the authenticated state is not set; and
   an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:
   the specific period of time is a period during which an immobilizer is in an unlocked state; and the external tool is an apparatus other than a wireless communication device that sets the unlocked state and a locked state of the immobilizer, the vehicular data communication authentication system further comprising;
a vehicular gateway apparatus that partitions the external tool from the ECUs, wherein:
the authentication device, the authentication control device and the authentication maintain device are provided in the vehicular gateway apparatus, and
a communication control device that, in a situation where the authenticated state is not set by the authentication device, permits the data communication between the external tool and the access target ECU only for a specified data, wherein
the vehicular gateway apparatus and the access target ECU is mounted in a vehicle;
the external tool is external with respect to the vehicle;
the vehicular gateway apparatus is separated from the access target ECU and the external tool and
the communication control device is provided in the vehicular gateway apparatus.

2. The vehicular data communication authentication system according to claim 1, wherein
the authentication control device determines whether or not it is necessary to set the authenticated state based on a received data request from the external tool.

3. The vehicular data communication authentication system according to claim 1, wherein the authentication control device determines that it is necessary to set the authenticated state when the received data request comprises a non-regulation message.

4. A vehicular data communication authentication system in which an external tool is connectable to a bus connected with electronic control units (ECUs) including an access target ECU, the vehicular data communication authentication system comprising:
an authentication device that performs authentication of a vehicle state;
an authentication control device that:
determines whether or not a result of the authentication of the vehicle state performed by the authentication device is affirmative;
when determining that the result of the authentication of the vehicle state is affirmative, sets an authenticated state as a state in which the external tool is authenticated;
permits a data communication between the external tool and the access target ECU as long as the authenticated state is set;
when determining that the result of the authentication of the vehicle state is not affirmative, does not set the authenticated state; and
prohibits the data communication between the external tool and the access target ECU as long as the authenticated state is not set; and
an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:
the specific period of time is a period during which an immobilizer is in an unlocked state; and the external tool is an apparatus other than a wireless communication device that sets the unlocked state and a locked state of the immobilizer, further comprising:
a vehicular gateway apparatus that partitions the external tool from the ECUs, wherein:
the authentication device, the authentication control device and the authentication maintain device are provided in the vehicular gateway apparatus, and
a communication control device that, in a situation where the authenticated state is not set by the authentication device, permits the data communication between the external tool and the access target ECU only for a specified data, wherein
the vehicular gateway apparatus and the access target ECU is mounted in a vehicle;
the external tool is external with respect to the vehicle;
the vehicular gateway apparatus is separated from the access target ECU and the external tool; and
the communication control device is provided in the vehicular gateway apparatus.

5. A vehicular gateway apparatus in a vehicular data authentication system, in which an external tool is connectable to a bus connected with electronic control units (ECUs) including an access target ECU and in which the vehicular gateway apparatus partitions the external tool from the ECUs, the vehicular gateway apparatus comprising:
an authentication device that performs authentication of the external tool connected to the bus;
an authentication control device that:
determines whether or not a result of the authentication of the external tool performed by the authentication device is affirmative;
when determining that the result of the authentication of the external tool is affirmative, sets an authenticated state as a state in which the external tool is authenticated;
permits a data communication between the external tool and the access target ECU as long as the authenticated state is set;
when determining that the result of the authentication of the external tool is not affirmative, does not set the authenticated state; and
prohibits the data communication between the external tool and the access target ECU as long as the authenticated state is not set; and
an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:
the specific period of time is a period during which an immobilizer is in an unlocked state; and the external tool is an apparatus other than a wireless communication device that sets the unlocked state and a locked state of the immobilizer, further comprising:
a communication control device that, in a situation where the authenticated state is not set by the authentication device, permits the data communication between the external tool and the access target ECU only for a specified data, wherein
the vehicular gateway apparatus and the access target ECU is mounted in a vehicle;
the external tool is external with respect to the vehicle;
the vehicular gateway apparatus is separated from the access target ECU and the external tool and
the communication control device is provided in the vehicular gateway apparatus.

6. The vehicular gateway apparatus according to claim 5, wherein:
the external tool is configured to rewrite a control program of the access target ECU and read out a data from the access target ECU according to an operator's input operation to the external tool; and
the gateway apparatus receives information on whether the immobilizer is in the unlocked state or the lock state, not from the external tool but from an ECU other than the access target ECU.

7. A vehicular gateway apparatus in a vehicular data authentication system, in which an external tool is connectable to a bus connected with electronic control units including an access target ECU and in which the vehicular gateway apparatus partitions the external tool from the ECUs, the vehicular gateway apparatus comprising:
an authentication device that performs authentication of a vehicle state;
an authentication control device that:
determines whether or not a result of authentication of the vehicle state performed by the authentication device is affirmative;
when determining that the result of authentication of the vehicle state is affirmative, sets an authenticated state as a state in which the external tool is authenticated;
permits a data communication between the external tool and the access target ECU as long as the authenticated state is set;
when determining that the result of authentication of the vehicle state is not affirmative, does not set the authenticated state; and
prohibits the data communication between the external tool and the access target ECU as long as the authenticated state is not set; and
an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:
the specific period of time is a period during which an immobilizer is in an unlocked state; and the external tool is an apparatus other than a wireless communication device that sets the unlocked state and a locked state of the immobilizer, further comprising:
a communication control device that, in a situation where the authenticated state is not set by the authentication device, permits the data communication between the external tool and the access target ECU only for a specified data, wherein
the vehicular gateway apparatus and the access target ECU is mounted in a vehicle;
the external tool is external with respect to the vehicle;
the vehicular gateway apparatus is separated from the access target ECU and the external tool; and
the communication control device is provided in the vehicular gateway apparatus.

8. A vehicular data communication authentication system in which an external tool is connectable to a bus connected with electronic control units (ECUs) including an access target ECU, the vehicular data communication authentication system comprising:
an authentication device that performs authentication of the external tool connected to the bus;
an authentication control device that:
determines whether or not a result of the authentication of the external tool performed by the authentication device is affirmative;
when determining that the result of the authentication of the external tool is affirmative, sets an authenticated state as a state in which the external tool is authenticated;
permits a data communication between the external tool and the access target ECU as long as the authenticated state is set;
when determining that the result of the authentication of the external tool is not affirmative, does not set the authenticated state; and
prohibits the data communication between the external tool and the access target ECU as long as the authenticated state is not set; and
an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:
the specific period of time is a period during which an authenticated state maintain request is inputted from the access target ECU to the authentication control device, the vehicular data communication authentication system further comprising;
a vehicular gateway apparatus that partitions the external tool from the ECUs, wherein:
the authentication device, the authentication control device and the authentication maintain device are provided in the vehicular gateway apparatus, and a communication control device that, in a situation where the authenticated state is not set by the authentication device, permits the data communication between the external tool and the access target ECU only for a specified data, wherein
the vehicular gateway apparatus and the access target ECU is mounted in a vehicle;
the external tool is external with respect to the vehicle;
the vehicular gateway apparatus is separated from the access target ECU and the external tool and
the communication control device is provided in the vehicular gateway apparatus.

9. A vehicular data communication authentication system in which an external tool is connectable to a bus connected with electronic control units (ECUs) including an access target ECU, the vehicular data communication authentication system comprising:
an authentication device that performs authentication of a vehicle state;
an authentication control device that:
determines whether or not a result of the authentication of the vehicle state performed by the authentication device is affirmative;
when determining that the result of the authentication of the vehicle state is affirmative, sets an authenticated state as a state in which the external tool is authenticated;
permits a data communication between the external tool and the access target ECU as long as the authenticated state is set;
when determining that the result of the authentication of the vehicle state is not affirmative, does not set the authenticated state; and prohibits the data communication between the external tool and the access target ECU as long as the authenticated state is not set; and an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:

the specific period of time is a period during which an authenticated state maintain request is inputted from the access target ECU to the authentication control device, the vehicular data communication authentication system further comprising;

a vehicular gateway apparatus that partitions the external tool from the ECUs, wherein:

the authentication device, the authentication control device and the authentication maintain device are provided in the vehicular gateway apparatus, and a communication control device that, in a situation where the authenticated state is not set by the authentication device, permits the data communication between the external tool and the access target ECU only for a specified data, wherein the vehicular gateway apparatus and the access target ECU is mounted in a vehicle;

the external tool is external with respect to the vehicle;

the vehicular gateway apparatus is separated from the access target ECU and the external tool; and the communication control device is provided in the vehicular gateway apparatus.

10. A vehicular gateway apparatus in a vehicular data authentication system, in which an external tool is connectable to a bus connected with electronic control units (ECUs) including an access target ECU and in which the vehicular gateway apparatus partitions the external tool from the ECUs, the vehicular gateway apparatus comprising:

an authentication device that performs authentication of the external tool connected to the bus;

an authentication control device that:

determines whether or not a result of the authentication of the external tool performed by the authentication device is affirmative;

when determining that the result of the authentication of the external tool is affirmative, sets an authenticated state as a state in which the external tool is authenticated;

permits a data communication between the external tool and the access target ECU as long as the authenticated state is set;

when determining that the result of the authentication of the external tool is not affirmative, does not set the authenticated state; and prohibits the data communication between the external tool and the access target ECU as long as the authenticated state is not set; and an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:

the specific period of time is a period during which an authenticated state maintain request is inputted from the access target ECU to the authentication control device, further comprising:

a communication control device that, in a situation where the authenticated state is not set by the authentication device, permits the data communication between the external tool and the access target ECU only for a specified data, wherein the vehicular gateway apparatus and the access target ECU is mounted in a vehicle;

the external tool is external with respect to the vehicle;

the vehicular gateway apparatus is separated from the access target ECU and the external tool; and the communication control device is provided in the vehicular gateway apparatus.

11. A vehicular gateway apparatus in a vehicular data authentication system, in which an external tool is connectable to a bus connected with electronic control units including an access target ECU and in which the vehicular gateway apparatus partitions the external tool from the ECUs, the vehicular gateway apparatus comprising:

an authentication device that performs authentication of a vehicle state;

an authentication control device that:

determines whether or not a result of authentication of the vehicle state performed by the authentication device is affirmative;

when determining that the result of authentication of the vehicle state is affirmative, sets an authenticated state as a state in which the external tool is authenticated;

permits a data communication between the external tool and the access target ECU as long as the authenticated state is set;

when determining that the result of authentication of the vehicle state is not affirmative, does not set the authenticated state; and prohibits the data communication between the external tool and the access target ECU as long as the authenticated state is not set; and an authentication maintain device that maintains the authenticated state within a specific period of time after the authenticated state is set by the authentication control device, and that ends the authenticated state and starts prohibiting the data communication between the external tool and the access target ECU upon elapse of the specific period of time, wherein:

the specific period of time is a period during which an authenticated state maintain request is inputted from the access target ECU to the authentication control device, further comprising:

a communication control device that, in a situation where the authenticated state is not set by the authentication device, permits the data communication between the external tool and the access target ECU only for a specified data, wherein the vehicular gateway apparatus and the access target ECU is mounted in a vehicle;

the external tool is external with respect to the vehicle;

the vehicular gateway apparatus is separated from the access target ECU and the external tool; and the communication control device is provided in the vehicular gateway apparatus.

* * * * *